US012524624B2

(12) United States Patent
Chen et al.

(10) Patent No.: US 12,524,624 B2
(45) Date of Patent: Jan. 13, 2026

(54) DOMAIN-SPECIFIC TEXT LABELLING USING NATURAL LANGUAGE INFERENCE MODEL

(71) Applicant: Fujitsu Limited, Kawasaki (JP)

(72) Inventors: Wei-Peng Chen, Fremont, CA (US); Mehdi Bahrami, San Jose, CA (US); Lei Liu, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 544 days.

(21) Appl. No.: 18/055,862

(22) Filed: Nov. 16, 2022

(65) Prior Publication Data

US 2024/0160852 A1   May 16, 2024

(51) Int. Cl.
*G06F 40/40* (2020.01)
(52) U.S. Cl.
CPC .................................. *G06F 40/40* (2020.01)
(58) Field of Classification Search
None
See application file for complete search history.

(56) References Cited

U.S. PATENT DOCUMENTS

| | | | | |
|---|---|---|---|---|
| 12,038,962 B2* | 7/2024 | Barrow | ................ | G06F 40/279 |
| 2021/0174204 A1* | 6/2021 | Yin | ........................ | G06N 3/08 |
| 2023/0418873 A1* | 12/2023 | Gao | ...................... | G06N 20/00 |

OTHER PUBLICATIONS

Gordon, T.F. , 2011. Analyzing open source license compatibility issues with Carneades. In: Proceedings of the 13th International Conference on Artificial Intelligence and Law (ICAIL '11). ACM, pp. 51-55 . (Year: 2011).*
Extended European Search Report dated Feb. 2, 2024 for corresponding European Patent Application No. 23196795.1, 8 pages.
Yordanov, Yordan et al., "Few-Shot Out-of-Domain Transfer Learning of Natural Language Explanations", Dec. 12, 2021, pp. 1-20, Retrieved form the Internet: URL:https://arxiv.org/pdf/2112.06204v1.pdf, XP093123912.
Erliksson, Karl Fredrik et al., "Cross-Domain Transfer of Generative Explanations Using Text-to-Text Models", Retrieved form the Internet: URL: https://link.springer.com/content/pdf/10.1007/978-3-030-80599-9.pdf [retrieved on Jan. 25, 2024], pp. 76-89, XP093123925.

(Continued)

*Primary Examiner* — Nicole A K Schmieder
(74) *Attorney, Agent, or Firm* — Fujitsu Intellectual Property Center

(57) ABSTRACT

In an embodiment, a set of texts associated with a domain is received. A set of hypothesis statements associated with the domain is received. A pre-trained natural language inference (NLI) model is applied on each of the received set of texts and on each of the received set of hypothesis statements. A second text corpus associated with the domain is generated. The generated second text corpus corresponds to a set of labels associated with the domain. A few-shot learning model is applied on the generated second text corpus to generate a third text corpus associated with the domain. The generated third text corpus is configured to fine-tune the applied pre-trained NLI model, and the fine-tuned NLI model is configured to label an input text associated with the domain. A display of the labelled input text on a display device is controlled.

18 Claims, 15 Drawing Sheets

(56) References Cited

OTHER PUBLICATIONS

The Stanford Natural Language Processing Group, "The Stanford Natural Language Inference (SNLI) Corpus," obtained from https://nlp.stanford.edu/projects/snli/.
Sam Bowman and Xiadan Zhu, "Deep Learning for Natural Language Inference," NAACL-HLT 2019 Tutorial, obtained from https://nlitutorial.github.io/nli_tutorial.pdf.
Ashish Vaswani, Noam Shazeer, Niki Parar, Jakob Uszkoreit, Llion Jones, Aidan N. Gomez, Lukasz Kaiser, Illia Polosukhin, "Attention is All You Need," obtained from https://arxiv.org/abs/1706.03762v5.
Hugging Face Roberta-Large-MNLI, Model obtained from https://huggingface.co/roberta-large-mnli?text=I+like+you.+I+love+you.
Adina Williams, Nikita Nangia, Sam Bowman, "The Multi-Genre NLI Corpus," obtained from https://cims.nyu.edu/~sbowman/multinli/.
Kaggle, Kaggle Competitions, obtained from https://www.kaggle.com/competitions.
Kaggle, Kaggle Competitions, Allstate Claim Prediction Challenge (Featured Prediction Competition), obtained from https://www.kaggle.com/competitions/ClaimPredictionChallenge/rules.
Hugging Face Bart-Large-MNLI Model obtained from https://huggingface.co/facebook/bart-large-mnli.
Snorkle, Programmatically Build Training Data, obtained from https://www.snorkel.org/.
Sowmya Vajjala, Bodhisattwa Majumder, Anuj Gupta, Harshit Surana, "Practical Natural Language Processing," O'Reilly, obtained from https://www.oreilly.com/library/view/practical-natural-language/9781492054047/ch04.html.
Purva Huilgol, "Top 6 Open Source Pretrained Models for Text Classification you should use," Analytics Vidhya, Published On Mar. 18, 2020 and Last Modified On Apr. 16, 2020, obtained from https://www.analyticsvidhya.com/blog/2020/03/6-pretrained-models-text-classification/.
Adam R. Bates, "Automated Software License and Copyright Analysis," (2010) obtained from https://scholar.colorado.edu/concern/graduate_thesis_or_dissertations/1831ck305 last modified Nov. 18, 2019.
Chris A. Mattman Ji-Hyun Oh Tyler Palsulich, Lewis John Mcgibbney, Yolanda Gil, Varun Ratnakar, "DRAT: An Unobtrusive, Scalable Approach to Large Scale Software License Analysis," obtained from https://www.isi.edu/~gil/papers/mattmann-etal-softmine2015.pdf.
The Apache Software Foundation, "Apache Rat," obtained from https://creadur.apache.org/rat/.

\* cited by examiner

Application Program 1
License text/Legal Agreement Text 402

Users are not permitted to use the application for commercial purposes.

Users are not permitted to rent, lease, resell, assign, or distribute the application.

Users agree that they wont modify, reverse engineer, transfer, disclose, disassemble, or decompile the application.

Users are not permitted they would not use the application or encourage others to use the application in a way that can harm others.

1. Participants cannot share data to anyone outside their team. — 1104

2. During the competition, participants are not allowed to share source or codes developed for competition privately. Participants found indulging in private sharing of the data may be disqualified. — 1106

3. Users will not use data other than the data provided for the competition purpose — 1108

*FIG. 11*

DOMAIN-SPECIFIC TEXT LABELLING USING NATURAL LANGUAGE INFERENCE MODEL

FIELD

The embodiments discussed in the present disclosure are related to domain-specific text labelling using natural language inference model.

BACKGROUND

Advancements in the field of machine learning have led to development of a number of machine learning models, such as, natural language processing model. Text classification that is sometimes also referred to as topic classification, text categorization, or document categorization is a classical problem of natural language processing (NLP). One example of text classification problem is sentiment analysis. Most text classification approaches are based on supervised learning, which may require large amount of training data to build a good model. However, building large amount of labeled training data may be time-consuming and may require a lot of human effort. Thus, there is a need for efficient techniques to train an NLP model.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations, which may include receiving a set of texts associated with a domain from a first text corpus associated with the domain. The set of operations may further include receiving a set of hypothesis statements associated with the domain. The set of operations may further include applying a pre-trained natural language inference (NLI) model on each of the received set of texts and on each of the received set of hypothesis statements. The set of operations may further include generating a second text corpus associated with the domain, based on the application of the pre-trained NLI model. The generated second text corpus may correspond to a set of labels associated with the domain. The set of operations may further include applying a few-shot learning model on the generated second text corpus to generate a third text corpus associated with the domain. The generated third text corpus may be configured to fine-tune the applied pre-trained NLI model, and the fine-tuned NLI model may be configured to label an input text associated with the domain, based on the received set of hypothesis statements. The set of operations may further include controlling a display of the labelled input text on a display device.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 is a diagram that illustrates an exemplary scenario for license text/legal agreement text for an application program;

FIG. 11 is a diagram that illustrates an exemplary scenario of a set of key sentences;

DESCRIPTION OF EMBODIMENTS

Figure 1:
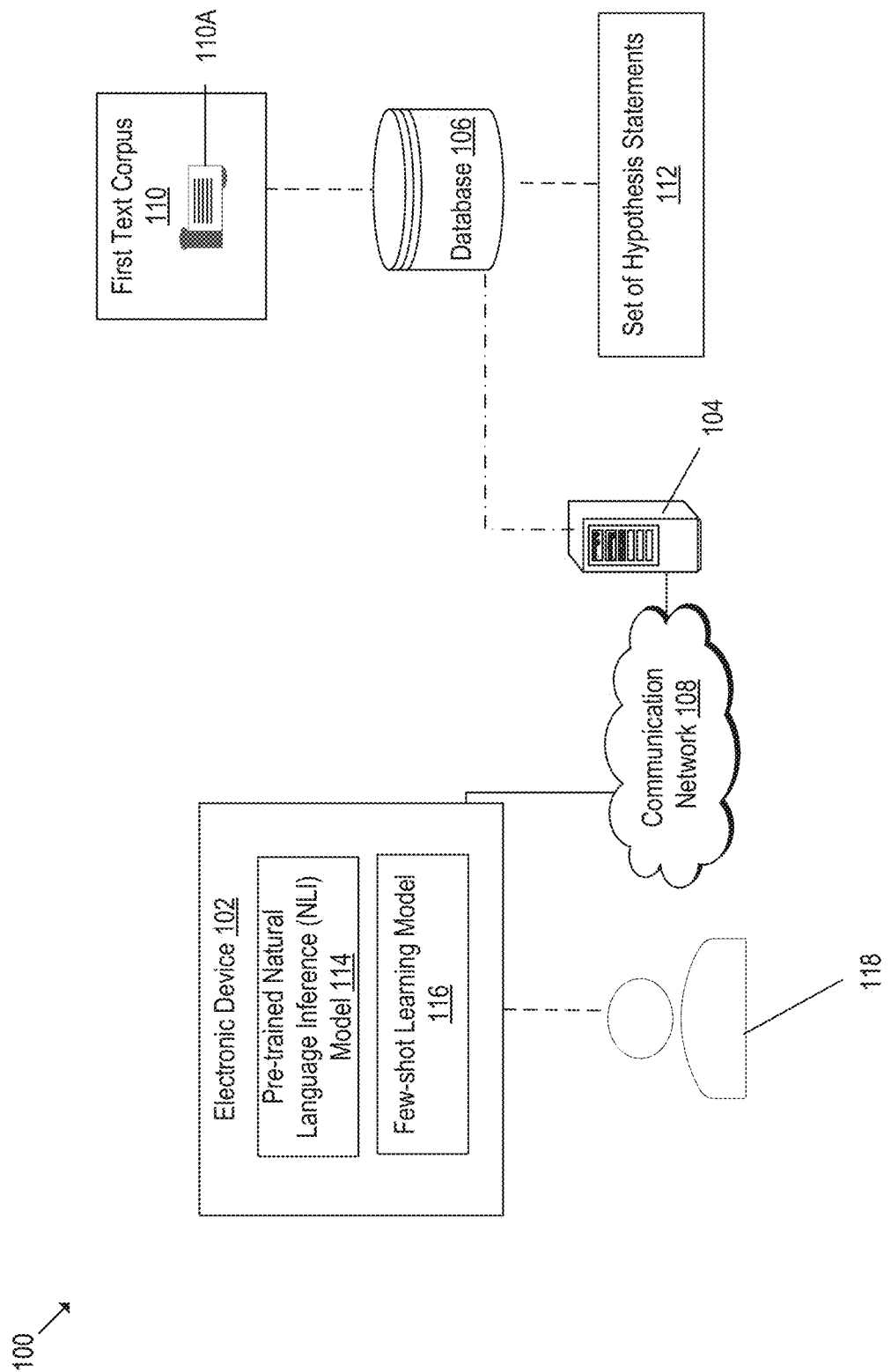
FIG. 1 is a diagram representing an example environment related to domain-specific text labelling using natural language inference model.

Some embodiments described in the present disclosure relate to methods and systems for domain-specific text labelling using natural language inference model. A set of texts associated with a domain may be received from a first text corpus associated with the domain. Further, a set of hypothesis statements associated with the domain may be received. Thereafter, a pre-trained natural language inference (NLI) model may be applied on each of the received set of texts and on each of the received set of hypothesis statements. Further, a second text corpus associated with the domain may be generated based on the application of the pre-trained NLI model. The generated second text corpus may correspond to a set of labels associated with the domain. Further, a few-shot learning model may be applied on the generated second text corpus to generate a third text corpus associated with the domain. The generated third text corpus may be configured to fine-tune the applied pre-trained NLI model, and the fine-tuned NLI model may be configured to label an input text associated with the domain, based on the received set of hypothesis statements. Thereafter, a display of the labelled input text on a display device may be controlled.

According to one or more embodiments of the present disclosure, the technological field of natural language processing may be improved by configuring a computing system (e.g., an electronic device) in a manner that the computing system may be able to execute domain-specific labelling using a natural language inference model. The computing system may receive a set of texts associated with a domain from a first text corpus associated with the domain. Further, the computing system may receive a set of hypothesis statements associated with the domain. Thereafter, the computing system may apply a pre-trained natural language inference (NLI) model on each of the received set of texts and on each of the received set of hypothesis statements. Further, the computing system may generate a second text corpus associated with the domain based on the application of the pre-trained NLI model. The generated second text corpus may correspond to a set of labels associated with the domain. Further, the computing system may apply a few-shot learning model on the generated second text corpus to generate a third text corpus associated with the domain. The generated third text corpus may be configured to fine-tune the applied pre-trained NLI model, and the fine-tuned NLI model may be configured to label an input text associated with the domain, based on the received set of hypothesis statements. Thereafter, the computing device may control a display of the labelled input text on a display device.

It may be appreciated that open-source code or data have become important assets for the software industry as the open-source code or data may be used as low-cost resources to build a training corpus for machine learning models. However, the use of open-source code or data might may not always be without any restriction, particularly if the use is for commercial purpose. To judge whether a resource such as, the open-source code or data, may be legally used for a commercial purpose may require a manual review of a set of terms and conditions associated with the use of the resource. The manual review of the set of terms and conditions may be a tedious and time-consuming task. The disclosed electronic device may leverage pre-trained language models to create training data to train and fine-tune a machine learning (e.g., an NLI) model. The trained and fined-tuned NLI model may analyze the set of terms and conditions of the open-source code or data and may label an input text. The labelled input text may indicate whether or not the open-source code or data may be used for commercial purposes.

Typically, various types of pre-trained models trained from a large text corpus from a wide range of genres may be publicly available. Such pre-trained language models may be used in text classification problems directly. However, without fine-tuning, the pre-trained language model may not be accurate on domain-specific text classification tasks. The disclosed electronic device may generate a third text corpus associated with the training data efficiently. The third text corpus may be used to fine-tune the pre-trained NLI model to further improve the performance (e.g., the accuracy) of the NLI model. The fine-tuned NLI model may then be applied on an input text (e.g., terms and conditions of usage of a source code or data) to label the input text. Thereafter, the labelled input text may be presented to the user. The user may go through the labelled input text and may know whether or not the input text may be used for commercial purposes.

Embodiments of the present disclosure are explained with reference to the accompanying drawings.

FIG. 1 is a diagram representing an example environment related to domain-specific text labelling using natural language inference model, according to at least one embodiment described in the present disclosure. With reference to FIG. 1, there is shown an environment 100. The environment 100 may include an electronic device 102, a server 104, a database 106, a communication network 108, a first text corpus 110, and a set of hypothesis statements 112. The electronic device 102, the server 104, and a device hosting the database 106 may be communicatively coupled to one another, via the communication network 108. The electronic device 102 may include a pre-trained natural language inference (NLI) model 114 and a few-shot learning model 116. The database 106 may include the first text corpus 110 and the set of hypothesis statements 112. The first text corpus 110 may include a set of texts 110A. In FIG. 1, there is further shown a user 118, who may be associated with or operate the electronic device 102.

The electronic device 102 may include suitable logic, circuitry, and interfaces that may be configured to receive the set of texts 110A associated with a domain from the first text corpus 110 associated with the domain. The electronic device 102 may be further configured to receive the set of hypothesis statements 112 associated with the domain. The electronic device 102 may apply the pre-trained natural language inference (NLI) model 114 on each of the received set of texts 110A and on each of the received set of hypothesis statements 112. The electronic device 102 may be further configured to generate a second text corpus associated with the domain, based on the application of the pre-trained NLI model 114. Herein, the generated second text corpus may correspond to a set of labels associated with the domain.

The server 104 may include suitable logic, circuitry, and interfaces, and/or code that may be configured to store the pre-trained NLI model 114 and apply the few-shot learning model 116 on the generated second text corpus to generate a third text corpus associated with the domain. Herein, the generated third text corpus may be configured to fine-tune the applied pre-trained NLI model 114, and the fine-tuned NLI model may be configured to label an input text associated with the domain, based on the received set of hypothesis statements 112. The server 104 may be further configured to control a display of the labelled input text on a display device (not shown in FIG. 1) associated with the electronic device 102. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that may be well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The database 106 may include suitable logic, interfaces, and/or code that may be configured to store the first text corpus such as, the first text corpus 110, the generated second text corpus, and the generated third text corpus. The database 106 may also store the set of hypothesis statements 112. In certain embodiments, the pre-trained NLI model 114 and the few-shot learning model 116 may also be stored in the database 106. The database 106 may be derived from data off a relational or non-relational database, or a set of comma-separated values (csv) files in conventional or big-data storage. The database 106 may be stored or cached on a device, such as a server or the electronic device 102. The device storing the database 106 may be configured to receive a query for the first text corpus such as, the first text corpus 110, the generated second text corpus, and/or the generated third text corpus from the electronic device 102. In response, the device of the database 106 may be configured to retrieve and provide queried corpus to the electronic device 102 based on the received query. In some embodiments, the database 106 may be hosted on a plurality of servers stored at same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102, the server 104, and the device hosting the database 106 may communicate with each other. The communication network 108 may be one of a wired connection or a wireless connection. Examples of the communication network 108 may include, but are not limited to, the Internet, a cloud network, Cellular or Wireless Mobile Network (such as Long-Term Evolution and 5G New Radio), a satellite communicate network (using, for example, a set of low earth orbit satellites), a Wireless Fidelity (Wi-Fi) network, a Personal Area Network (PAN), a Local Area Network (LAN), or a Metropolitan Area Network (MAN). Various devices in the environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The first text corpus 110 include suitable logic, interfaces, and/or code that may be configured to store the set of texts 110A associated with the domain. The first text corpus 110 may be derived from data off a relational or non-relational database, or a set of comma-separated values (csv) files in conventional or big-data storage. The first text corpus 110 may be stored or cached on a device, such as a server or the electronic device 102. The device storing the first text corpus 110 may be configured to receive a query for the first text corpus 110, the generated second text corpus, and the generated third text corpus from the electronic device 102. In response, the device of the first text corpus 110 may be configured to retrieve and provide an output of the query (for example, the set of texts 110A) to the electronic device 102 based on the received query. In some embodiments, the first text corpus 110 may be hosted on a plurality of servers stored at same or different locations. The operations of the first text corpus 110 may be executed using hardware including a processor, a microprocessor (e.g., to perform or control performance of one or more operations), a field-programmable gate array (FPGA), or an application-specific integrated circuit (ASIC). In some other instances, the first text corpus 110 may be implemented using software.

The set of texts 110A associated with the domain may be a license text, a legal agreement text, or an end-user license agreement text associated with an application that may be publicly available. The license text may be associated with a use of the application, an open-source code or data, and the like. For example, the license text may indicate whether the application or the open-source code may be used for commercial purposes, educational purposes, or non-profit personal use. The legal agreement text may an agreement between two parties. The end-user license agreement (EULA) text may be an agreement between with an end-user and a company associated with the application. For example, the EULA text may seek permission or consent from the end-user to collect anonymous usage data, demographic data, and/or some personal data.

The set of hypothesis statements 112 may include statements based on which the input text may be labelled. It may be noted that to apply the pre-trained NLI model 114 to a specific domain, appropriate set of hypothesis statements 112 may be considered as query sentences. The set of hypothesis statements 112 may depend on a specific user's interests. A library of hypothesis statements may be pre-built from most common domains.

The pre-trained NLI model 114, also known as recognizing textual entailment (RTE) model, may be used to infer a relationship between two short and ordered texts. The two short and ordered texts may be a premise and a hypothesis. The inference relationship may be one of entailment, contradiction, or neutral. In an example, if the premise is "A boat sank in the Pacific Ocean." and the hypothesis is "A boat sank in the Atlantic Ocean.", then the inference relation between the premise and the hypothesis may be contradiction as the premise may contradict the hypothesis. In an example, if the premise is "Ruth Bader Ginsburg was appointed to the US Supreme Court." and the hypothesis is "I had a sandwich for lunch today.", then the inference relation between the premise and the hypothesis may be neutral, as the premise and the hypothesis may not be related to each other. In an example, if the premise is "Two women are embracing while holding to go packages." And the hypothesis is "Two woman are holding packages.", then the inference relation between the premise and the hypothesis may be entailment, as the premise and the hypothesis may conform with each other.

The few-shot learning model 116 (which may be also called as one-shot learning or low-shot learning) may be trained with dataset having less samples, limited information, or lower training data. The few-shot learning model 116 may be applied on the generated second text corpus to generate the third text corpus associated with the domain. Herein, size of the generated second text corpus may be smaller than the size of the first text corpus 110. Hence, the few-shot learning model 116 may be trained faster. The electronic device 102 may perform domain-specific text labelling using fine-tuned natural language inference model, as described herein.

In operation, the electronic device 102 may receive the set of texts 110A associated with the domain from the first text corpus 110 associated with the domain. The electronic device 102 may request the database 106 for the set of texts 110A from the first text corpus 110 associated with the domain. The database 106 may verify an authenticity of the request and may provide the set of texts 110A associated with the domain to the processor 204 based on the verification.

The electronic device 102 may receive the set of hypothesis statements 112 associated with the domain. It may be noted that to apply the pre-trained NLI model 114 to the specific domain, appropriate set of hypothesis statements 112 may be considered as the query sentences. Details related to the set of hypothesis statements 112 are further described, for example, in FIG. 3.

The electronic device 102 may apply the pre-trained natural language inference (NLI) model 114 on each of the received set of texts 110A and on each of the received set of hypothesis statements 112. Details related to the application of the pre-trained NLI model 114 are further described, for example, in FIG. 5.

The electronic device 102 may generate the second text corpus associated with the domain, based on the application of the pre-trained NLI model 114. The generated second text corpus may be smaller in size than the first text corpus 110 and may be labelled. The set of labels associated with the domain may include sentences for the user 118 to confirm a label or manually update a label. Details related to the second text corpus generation are further described, for example, in FIG. 5 and FIG. 6.

The electronic device 102 apply the few-shot learning model 116 on the generated second text corpus to generate the third text corpus associated with the domain. The generated third text corpus may be configured to fine-tune the applied pre-trained NLI model 114, and the fine-tuned NLI model may be configured to label the input text associated with the domain, based on the received set of hypothesis statements 112. In an example, the labelling may indicate whether or not the input text may be used for commercial purposes. Details related to the third text corpus generation are further described, for example, in FIG. 13.

The electronic device 102 may control the display of the labelled input text on a display device. The labelled input text may be displayed on the display device so that the user 118 may make confirm or manually update a label. Thus, the user 118 may not have to read each sentence of the input text to decide whether to agree to the input text (e.g., a license agreement text) or not. Details related to the display of the labelled input text on the display device further described, for example, in FIG. 3.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 106. In addition, in some embodiments, the functionality of each of the database 106 and the server 104 may be incorporated into the electronic device 102, without a deviation from the scope of the disclosure.

Figure 2:
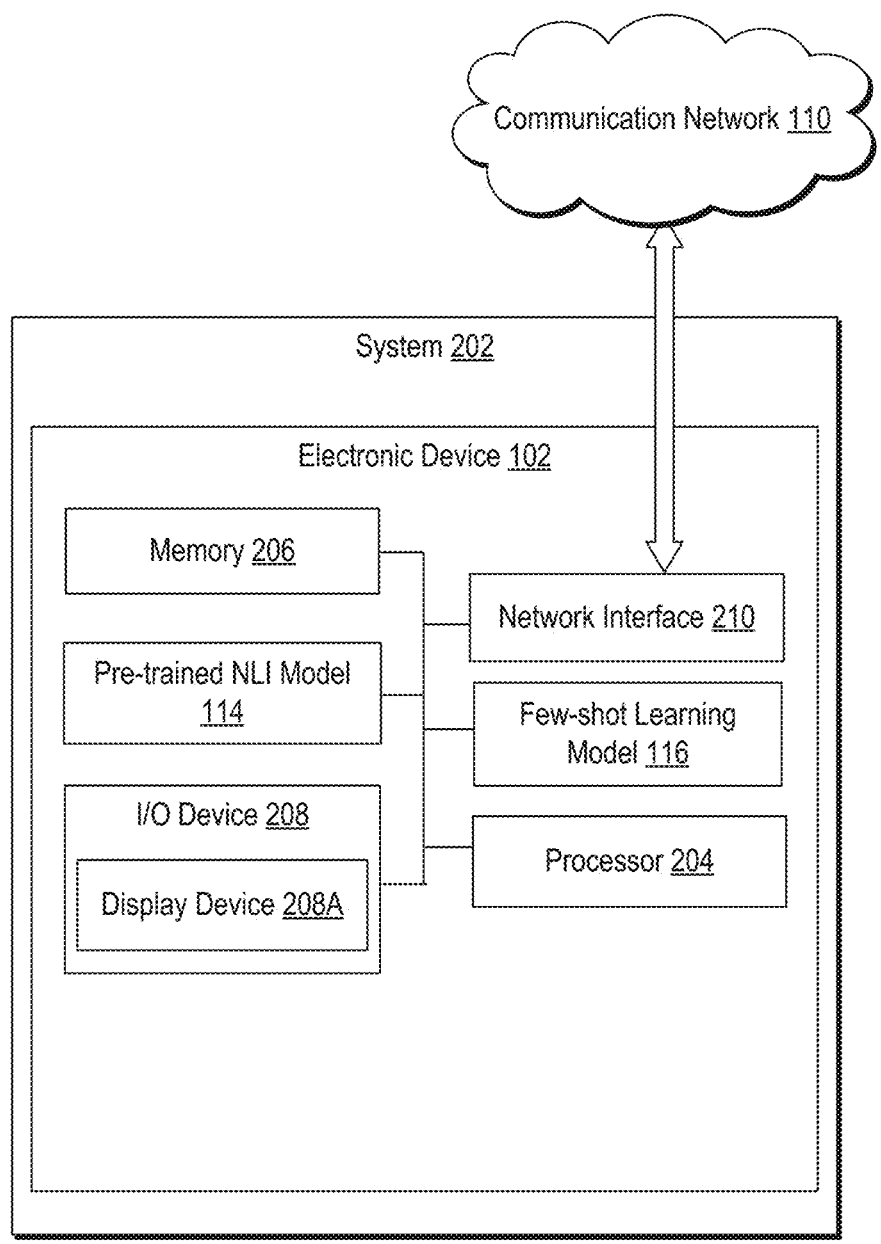
FIG. 2 is a block diagram that illustrates an exemplary electronic device for domain-specific text labelling using natural language inference model.

FIG. 2 is a block diagram that illustrates an exemplary electronic device for domain-specific text labelling using natural language inference model, in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include the pre-trained NLI model 114, the few-shot learning model 116, a processor 204, a memory 206, an input/output (I/O) device 208 (including a display device 208A), and a network interface 210.

The processor 204 may include suitable logic, circuitry, and interfaces that may be configured to execute a set of instructions stored in the memory 206. The processor 204 may be configured to execute program instructions associated with different operations to be executed by the electronic device 102. For example, some of the operations may include the reception of the set of texts reception, the reception of the set of hypothesis statements, the application of the pre-trained NLI model, the generation of the second text corpus, the application of the few-shot learning model, and the display control. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206. After the program instructions are loaded into the memory 206, the processor 204 may execute the program instructions.

The memory 206 may include suitable logic, circuitry, and interfaces that may be configured to store the one or more instructions to be executed by the processor 204. The one or more instructions stored in the memory 206 may be executed by the processor 204 to perform the different operations of the processor 204 (and the electronic device 102). The memory 206 that may be configured to store the first text corpus, the generated second text corpus, and the generated third text corpus. In an embodiment, the memory 206 may be further configured to store the pre-trained NLI model 114 and the few-shot learning model 116. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive an input from the user 118 and provide an output based on the received input. For example, the I/O device 208 may receive a user input indicative of a request to fine-tune the pre-trained NLI model 114. Further, the I/O device 208 may receive a user input indicative of a request to label an input text to highlight sentences associated with a certain hypothesis, such as, "a permission for commercial usage". Further, the I/O device 208 may render the labelled input text on the display device 208A. The I/O device 208 which may include various input and output devices, may be configured to communicate with the processor 204. Examples of the I/O device 208 may include, but are not limited to, a touch screen, a keyboard, a mouse, a joystick, a microphone, a display device (e.g., the display device 208A), and a speaker The display device 208A may include suitable logic, circuitry, and interfaces that may be configured to display the labelled input text. The display device 208A may be a touch screen which may enable a user to provide a user-input via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The network interface 210 may include suitable logic, circuitry, and interfaces that may be configured to facilitate communication between the processor 204, the server 104, and a device hosting the database 106 (and/or any other device in the environment 100), via the communication network 108. The network interface 210 may be implemented by use of various known technologies to support wired or wireless communication of the electronic device 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5$^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
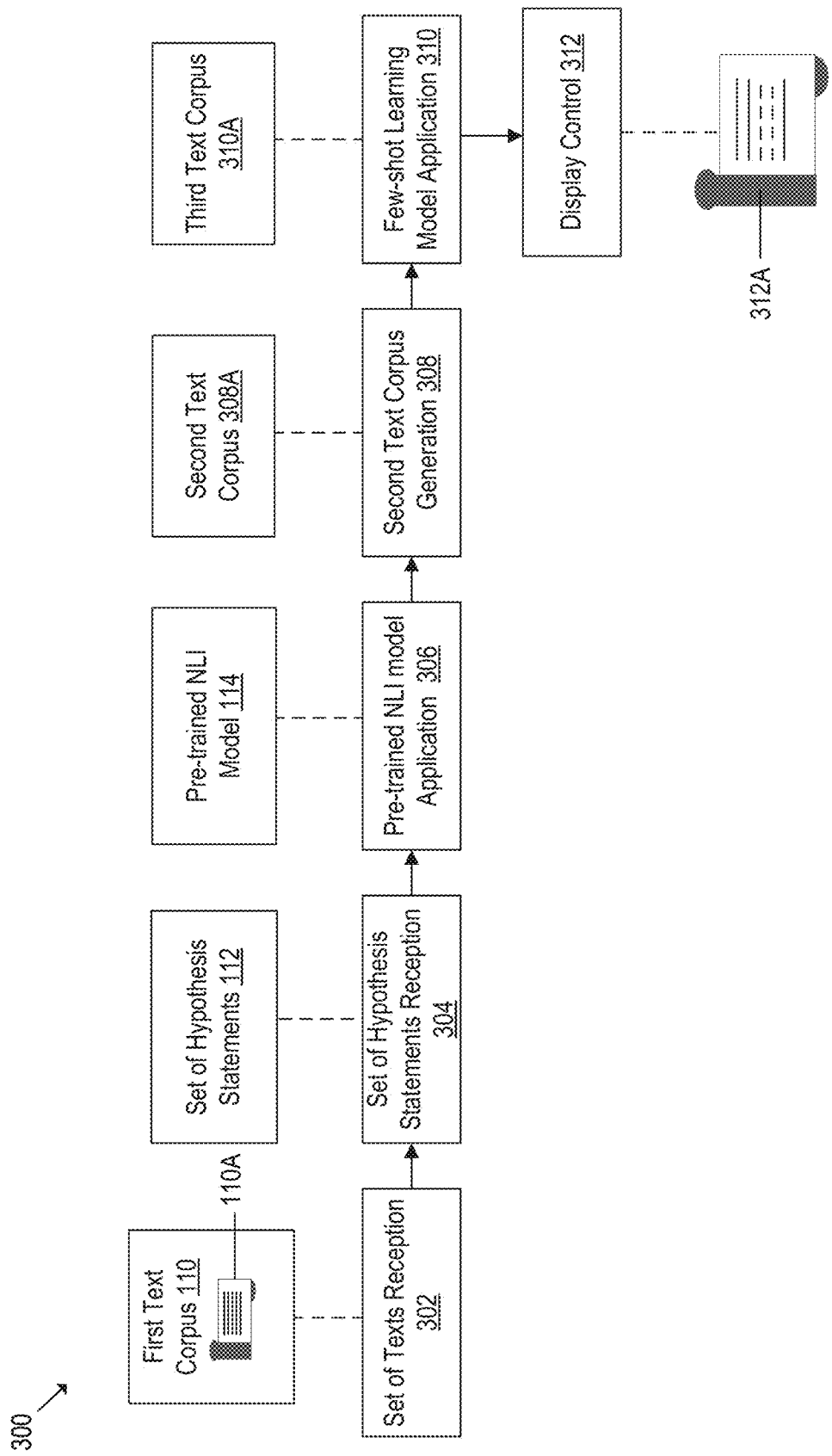
FIG. 3 is a diagram that illustrates an execution pipeline for domain-specific text labelling using natural language inference model.

FIG. 3 is a diagram that illustrates an execution pipeline for domain-specific text labelling using natural language inference model, in accordance with an embodiment of the disclosure. FIG. 3 is described in conjunction with elements from FIG. 1 and FIG. 2. With reference to FIG. 3, there is shown an execution pipeline 300. The exemplary execution pipeline 300 may include a set of operations that may be executed by one or more components of FIG. 1, such as, the electronic device 102. The operations may include a set of texts reception 302, a set of hypothesis statements reception 304, a pre-trained NLI model application 306, a second text corpus generation 308, a few-shot learning model application 310, and a display control 312. Further, the exemplary execution pipeline 300 includes the first text corpus 110 (including the set of texts 110A), the set of hypothesis statements 112, the pre-trained NLI model 114, a second text corpus 308A, a third text corpus 310A, and a labelled input text 312A. The set of operations may be performed by the electronic device 102 for domain-specific text labelling using natural language inference model, as described herein.

At 302, an operation for a reception of a set of texts may be executed. The processor 204 may be configured to receive the set of texts 110A associated with the domain from the first text corpus 110 associated with the domain. In an example, the database 106 may store a set of texts associated with each of a plurality of domains in each of a plurality of text corpus. For example, the domain of the first text corpus 110 may be reviews of a product on an e-commerce portal. The processor 204 may request the database 106 for the set of texts 110A associated with the domain from the first text corpus 110 associated with the domain. The database 106 may verify the authenticity of the request and may provide the set of texts 110A associated with the domain to the processor 204 based on the verification.

In an embodiment, the domain may correspond to a license text, a legal agreement text, or an end-user license agreement text associated with an application. The license text may be associated with the use of the application, the open data source, and the like. The legal agreement text may correspond to an agreement between two parties. For example, the legal agreement text may be an agreement between an end user and the open data source for usage of the open data source only for purposes specified in the legal agreement text. The end-user license agreement text may be associated with user of the application. In some cases, the application may collect information associated with the user such as, an activity of user, a location of the user, and the like. In an example, the end-user license agreement text may permit the application to collect only the activity of the user associated with the application, based on a consent from the end-user.

At 304, an operation for a reception of a set of hypothesis statements may be executed. The processor 204 may be configured to receive the set of hypothesis statements 112 associated with the domain. It may be noted that to apply the pre-trained NLI model 114 to a specific domain, appropriate set of hypothesis statements 112 may be considered as query sentences. The set of hypothesis statements 112 may depend on a specific user's interests. A library of hypothesis statements may be pre-built from a set of predefined domains. For instance, in a case of mobile application license agreements, the set of hypothesis statements 112 may be customized based on a general user's interests such as sharing data, tracking activities, sharing location, and the like. In an embodiment, the set of hypothesis statements 112 associated with the domain may be stored in the database 106. The processor 204 may request the database 106 to provide the set of hypothesis statements 112 associated with the domain. The database 106 may verify the request and may provide the set of hypothesis statements 112 to the processor 204 based on the verification.

In an embodiment, the set of hypothesis statements 112 associated with the domain may include at least one of a positive hypothesis statement, a neutral hypothesis statement, or a negative hypothesis statement. In an embodiment, the positive hypothesis statement may be affirmative sentences that may state where resources associated with the received set of texts 110A may be used. The negative hypothesis statement may be affirmative sentences and negative sentences that may state where the received set of texts 110A may not be used. The neutral hypothesis statement may not provide any information associated with where the received set of texts 110A may or may not be used. Both positive and negative hypothesis statements may be provided to query from different perspectives. In an example, a user may wish to know whether or not the input text received in a programming/coding competition may be used for a purpose of commercial purpose or not. In such a case, examples of the positive hypothesis statement may include, but is not limited to, "This data can be used for commercial use.", "You can use the data freely for any purpose.", and "There is no restriction to use the data.". Further, in such case, examples of the negative hypothesis statement may include, but is not limited to "This data cannot be used for commercial use.", "This data can only be used for non-commercial use.", and "This data is prohibited for commercial use."

At 306, an operation for a pre-trained NLI model application may be executed. The processor 204 may be configured to apply the pre-trained natural language inference (NLI) model 114 on each of the received set of texts 110A and on each of the received set of hypothesis statements 112. In an embodiment, the pre-trained NLI model 114 may implement a zero-shot algorithm on each of the received set of texts 110A and on each of the received set of hypothesis statements 112 to generate the second text corpus 308A. Thus, the pre-trained NLI model may correspond to an NLI model selected from a set of zero-shot NLI models. For example, the set of zero-shot NLI models may include, "roberta-large-mnli" and "bart-large-mnli" models. Details related to the application of the pre-trained NLI model 114 are further described, for example, in FIG. 5.

At 308, an operation for a second text corpus generation may be executed. The processor 204 may be configured to generate the second text corpus 308A associated with the domain, based on the application of the pre-trained NLI model 114. The generated second text corpus 308A may correspond to the set of labels associated with the domain. The generated second text corpus 308A may smaller be than the first text corpus 110 and may be labelled. The set of labels associated with the domain may include sentences for the user 118 to confirm a label or manually update a label. Details related to the second text corpus generation are further described, for example, in FIG. 5 and FIG. 6.

At 310, an operation for a few-shot learning model application may be executed. The processor 204 may be configured to apply the few-shot learning model 116 on the generated second text corpus 308A to generate the third text corpus 310A associated with the domain. The generated third text corpus 310A may be configured to fine-tune the applied pre-trained NLI model 114. The fine-tuned NLI model may be configured to label the input text associated with the domain, based on the received set of hypothesis statements 112. It may be appreciated that the few-shot learning model 116 (which may be also called as one-shot learning or low-shot learning may be trained with dataset with few samples, limited information, or lesser amount of training data. The generated second text corpus 308A may be smaller in size as compared to the first text corpus 110. Hence, the few-shot learning model 116 may be applied on the generated second text corpus 308A to generate the third text corpus 310A. The third text corpus 310A may be used to fine-tune the applied pre-trained NLI model 114 based on an update of a set of parameters associated with the applied pre-trained NLI model 114. In an example, the applied pre-trained NLI model 114 may be a 'roberta-large-mnli' model and a set of hyper parameters such as, epochs, training batch size, evaluation batch size, and the like, may be set as "10", "2", and "2" respectively. The set of hyper parameters may depend on a type of graphical processing units (GPUs) used. Further, a maximum length may be set as "512" in a tokenizer. As the number of training and validation pairs may not be large, a training time may be short. Further, a text accuracy may be "1.0", which may imply that the few-shot learning model may be an overfitted model. The fine-tuned NLI model may label the input text associated with the domain. The labelled input text 312A may include identified key sentences that may be displayed to users for final confirmation, through a graphical user interface. Details related to the third text corpus generation are further described, for example, in FIG. 13.

At 312, an operation for a display control may be executed. The processor 204 may be configured to control the display of the labelled input text 312A on the display device 208A. The labelled input text 312A may be displayed on the display device 208A so that the user may confirm a label or manually update a label. For example, the labelled input text 312A associated with the legal agreement text may include a set of statements that may state that the users may not use the received set of texts 110A for commercial purposes. The labelled input text 312A may be highlighted or color coded and the user 118 may go through them and accept or reject the legal agreement text based on a manual review or analysis of the labelled input text 312A. Thus, the user 118 may not have to go through each statement of the input text which may be a time consuming and laborious task. Based on the labelled input text 312A, the user 118 may have to go through only those statements that may be more relevant to decide whether to accept or reject the legal agreement for the user 118.

It may be noted that, open-source code or data may be important assets for software industry that may be used as a training corpus to build machine learning models. However, the use of open-source code or data may not always be without any restriction, particularly if the use is for commercial purpose. While some open-source code or data may use "standardized" (that is, commonly used) licenses, the other open-source code or data may have respective licenses specified as text description. In order to use such resources, the textual licenses may need to be manually checked to avoid violation of the license agreements. The electronic device 102 of the present disclosure may fine-tune the applied pre-trained NLI model 114 based on the few-shot learning model 116. The applied pre-trained NLI model 114 may be fine-tuned accurately, based even a small sample size of training data using the few-shot learning model 116. The fine-tuned NLI model may label the input text (e.g., a license agreement text) associated with the domain. The labelled input text 312A (e.g., highlighted or color-coded text) may be then displayed on the display device 208A. The user 118 may go through the labelled input text 312A and may not have manually check each sentence of the input text to decide whether to accept or reject the license agreement and accordingly use the respective open-source code or data.

It may be further noted that each mobile application may have its own license to specify the use of mobile app or describe how the application may collect users' data from a mobile phone. The user 118 may need to review the licenses of all applications used on the mobile phone to make sure the licenses match the preferences of the user 118. Most users may not pay attention to details in the licenses. Some services may provide simplified information or operations to users to ease the burden of checking licenses for users. However, if users have special preferences, such customized services may not available. Similar problems may be also applied for cookie policy when users browse through websites. The fine-tuned NLI model of the present disclosure may label the input text associated with the domain. The labelled input text 312A may be then displayed on the display device 208A. The user 118 may go through the labelled input text 312A and may not have manually check each sentence of the labelled input text 312A. Thus, the user 118 may review the important sentences of the license agreement text, which may be essential for the user 118 to decide whether to accept or reject the license agreement, thereby reducing an associated risk involved in an acceptance of the license agreement without reading. Further, as the entire license agreement text need not be reviewed by the user 118, time and effort of the user 118 may be saved.

FIG. 4 is a diagram that illustrates an exemplary scenario for license text/legal agreement text for an application program, in accordance with at least one embodiment described in the present disclosure. FIG. 4 is described in conjunction with elements from FIG. 1, FIG. 2, and FIG. 3. With reference to FIG. 4, there is shown an exemplary scenario 400. The exemplary scenario 400 may include a license text or a legal agreement text 402 for an application program 1.

With reference to FIG. 4, the license text or the legal agreement text 402 may be the input text that may be received by the processor 204. The license text or the legal agreement text 402 may include statements such as, "Users are not permitted to use the application for commercial purposes.", "Users are not permitted to rent, lease, resell, assign, or distribute the application.", "Users agree that they won't modify, reverse engineer, transfer, disclose, disassemble, or decompile the application.", and "Users are not permitted they would not use the application or encourage others to use the application in a way that can harm others." The user such as, the user 118, may have to read each such sentence of the license text or the legal agreement text 402 to determine whether the user can or cannot user the data outside the teams. In other words, a license to use the application program 1 may be exhausted outside the team of the user. Hence, the processor 204 may receive the license text or the legal agreement text 402 as the input text and may determine the labelled input text that may be displayed on the display device 208A. The labelled input text may include the highlighted text such as, "Users are not permitted to use the application for commercial purposes.". The user may go through the labelled input text rather than each statement of the input text to decide whether to accept or reject the license agreement.

It should be noted that the scenario 400 of FIG. 4 is for exemplary purposes and should not be construed to limit the scope of the disclosure.

Figure 5:
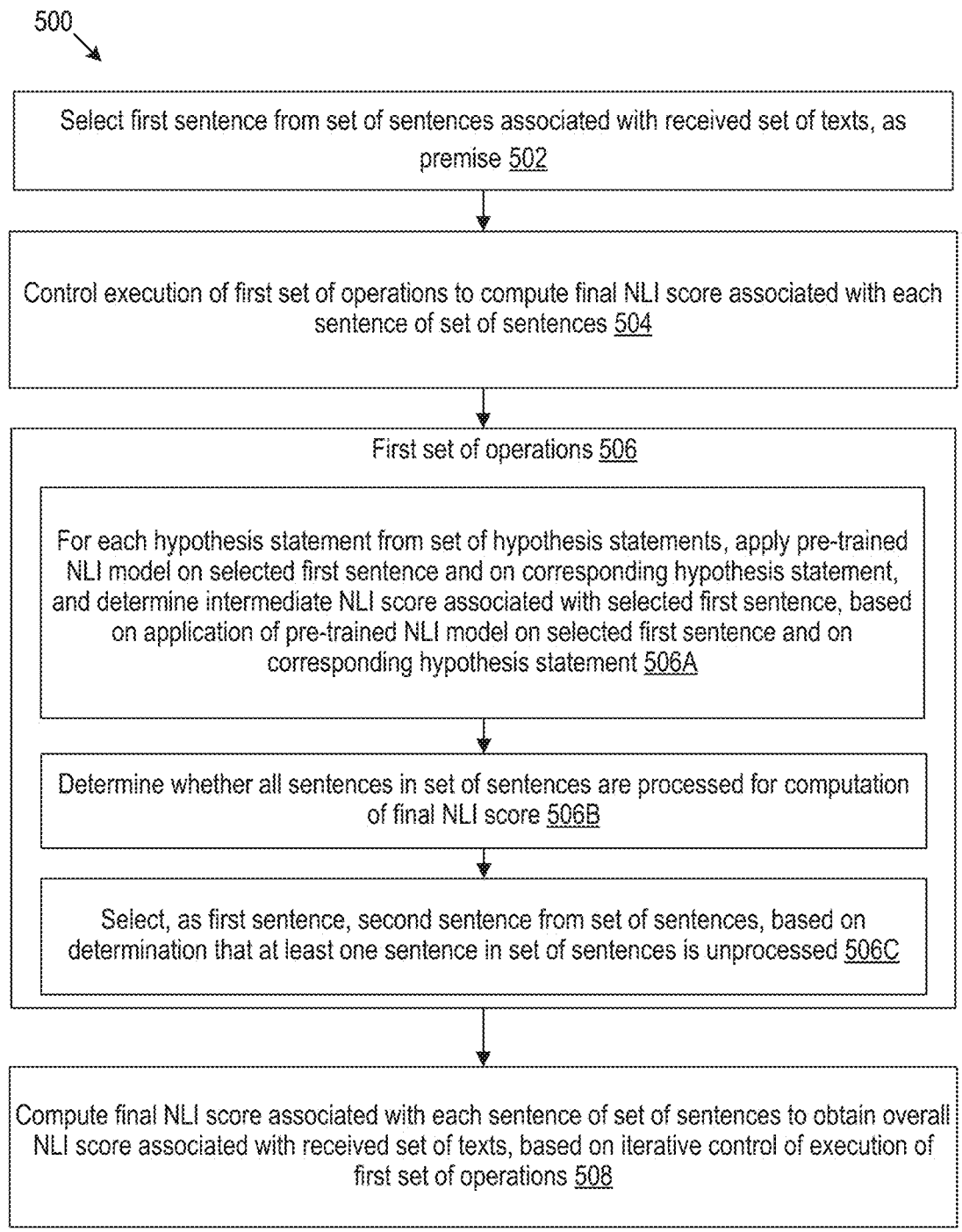
FIG. 5 is a diagram that illustrates a flowchart of an example method for computation of a final natural language inference (NLI) score for each sentence in a set of texts.

FIG. 5 is a diagram that illustrates a flowchart of an example method for computation of a final natural language inference (NLI) score for each sentence in a set of texts, in accordance with an embodiment of the disclosure. FIG. 5 is described in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, a first sentence from a set of sentences associated with the received set of texts may be selected as a premise. In an embodiment, the processor 204 may be configured to select the first sentence from the set of sentences associated with the received set of texts 110A, as a premise. It may be appreciated that the received set of texts (such as, the received set of texts 110A of FIG. 1) may include multiple sentences. The processor 204 may apply a sentence segmentation technique on the received set of texts 110A to separate the received set of texts 110A into the set of sentences. Further, various preprocessing techniques such as dropping short sentences (for example, sentences less than five words) may be applied. In some embodiments, the preprocessing techniques may check if a sentence includes any one keyword in a list of keywords which may be relevant. For example, the list of keywords may be, commercial, education, non-commercial, and the like. Once, the received set of texts 110A is separated into the set of sentences, one of the sentences from the separated set of sentences may be selected as the first sentence, which may correspond to the premise.

At block 504, an execution of a first set of operations may be controlled to compute a final NLI score associated with each sentence of the set of sentences. In an embodiment, the processor 204 may be configured to control an execution of the first set of operations to compute the final NLI score associated with each sentence of the set of sentences. The first set of operations may be executed for each sentence of the set of sentences. The first set of operations (denoted by 506) may include an operation 506A, an operation 506B, and an operation 506C, as described next herein.

At block 506, the first set of operations may be executed. In an embodiment, the processor 204 may be configured to execute the first set of operations. At block 506A, for each hypothesis statement from the set of hypothesis statements 112, the pre-trained NLI model 114 may be applied on the selected first sentence and on the corresponding hypothesis statement, and an intermediate NLI score associated with the selected first sentence may be determined, based on the application of the pre-trained NLI model 114 on the selected first sentence and on the corresponding hypothesis statement. In an embodiment, the processor 204 may be configured to apply the pre-trained NLI model 114 on the selected first sentence and on the corresponding hypothesis statement for each hypothesis statement from the set of hypothesis statements 112. The processor 204 may be further configured to determine the intermediate NLI score associated with the selected first sentence, based on the application of the pre-trained NLI model on the selected first sentence and on the corresponding hypothesis statement. In an embodiment, for each pre-trained NLI model (e.g., NLI_i), the selected first sentence (e.g., sentence_j) as the premise, and the hypothesis statement (e.g., statement_k), the processor 204 may compute the intermediate NLI score (e.g., NLI_score(i,j,k)) associated with the selected first sentence (i.e., sentence_j). The processor 204 may compute the intermediate NLI score (i.e., NLI_score(i,j,k)) based on an application programming interface (API)-call from the pre-trained NLI model 114 (i.e., NLI_i). The pre-trained NLI model 114 (i.e., NLI_i) may determine an inference relation between the premise (sentence_j) and hypothesis (statement_k). The inference relation may be one of, but not limited to, an entailment relation, a contradiction relation, or a neutral relation. The intermediate NLI score associated with the selected first sentence may be determined based on the determined inference relation. The intermediate NLI score may be a tuple of probabilities of three labels, such as, an entailment relation label, a contradiction relation label, or a neutral relation label. For example, if the determined inference relation corresponds to the contradiction relation, then the intermediate NLI score of contradiction relation label might be highest among three possible labels. If the determined inference relation is the neutral relation, then the intermediate NLI score of neutral relation label might be highest among three possible labels. Further, if the determined inference relation is the entailment relation, then the intermediate NLI score of entailment relation label might be highest among three possible labels.

At block 506B, it may be determined whether all sentences in the set of sentences are processed for the computation of the final NLI score. The processor 204 may be configured to determine whether all sentences in the set of sentences are processed for the computation of the final NLI score.

At block 506C, a second sentence from the set of sentences may be selected, as the first sentence based on a determination that at least one sentence in the set of sentences is unprocessed. The processor 204 may be configured to select, as the first sentence, the second sentence from the set of sentences, based on the determination that at least one sentence in the set of sentences is unprocessed. Herein, the operations 506A to 506C may be repeated till each sentence of the set sentences are processed. Thus, the intermediate NLI score for each of the set of sentences may be determined.

At block 508, the final NLI score associated with each sentence of the set of sentences may be computed to obtain an overall NLI score associated with the received set of texts, based on an iterative control of the execution of the first set of operations. The processor 204 may be configured to compute the final NLI score associated with each sentence of the set of sentences to obtain the overall NLI score associated with the received set of texts 110A, based on the iterative control of the execution of the first set of operations. For example, the final output of prediction classes may be determined as negative (where commercial use may not be allowed), neutral (where it is not specified whether commercial or non-commercial use is allowed), or positive (where commercial use may be allowed). Details of the determination of the final NLI score are further described, for example, in FIG. 6. Control may pass to end.

Although the flowchart 500 is illustrated as discrete operations, such as 502, 504, 506, and 508, however, in certain embodiments, such discrete operations may be further divided into additional operations, combined into fewer operations, or eliminated, depending on the particular implementation without detracting from the essence of the disclosed embodiments.

Figure 6:
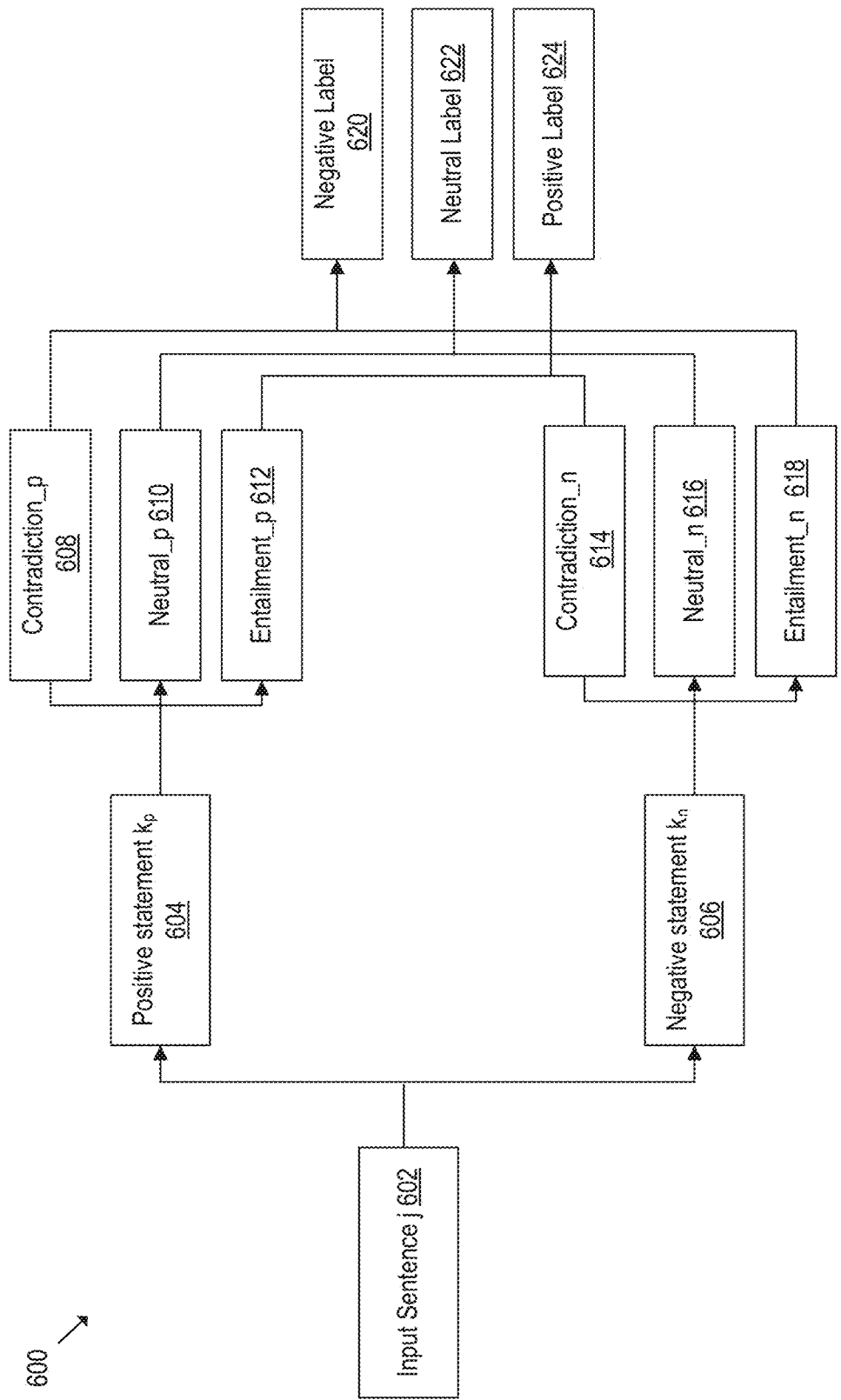
FIG. 6 is a diagram that illustrates an exemplary scenario for computing the final NLI score for each sentence in the set of texts.

FIG. 6 is a diagram that illustrates an exemplary scenario for computing the final NLI score for each sentence in the set of texts, in accordance with at least one embodiment described in the present disclosure. FIG. 6 is described in conjunction with elements from FIG. 1, FIG. 2, FIG. 3, FIG. 4, and FIG. 5. With reference to FIG. 6, there is shown an exemplary scenario 600. The exemplary scenario 600 may include an input sentence 602, a positive statement (K r) 604, a negative statement ($K_n$) 606, a score for contradiction relation label based on positive statement (contradiction_p) 608, a score for neutral relation label based on positive statement (neutral_p) 610, a score for entailment relation label based on positive statement (entailment_p) 612, a score for contradiction relation label based on negative statement (contradiction_n) 614, a score for neutral relation label based on negative statement (neutral_n) 616, a score for entailment relation label based on negative statement (entailment_n) 618, a negative label 620, a neutral label 622, and a positive label 624. The contradiction_p 608, the neutral_p 610, the entailment_p 612, the contradiction_n 614, the neutral_n 616, the entailment_n 618 may be the intermediate NLI scores. The negative label 620, the neutral label 622, and the positive label 624 may be the final NLI score.

In an embodiment, the final NLI score associated each sentence of the set of sentences may correspond to a weighted average of the intermediate NLI scores associated with the first sentence, for each hypothesis statement from the set of hypothesis statements. The final NLI score may be determined by taking an average of intermediate NLI scores over different pre-trained model (i.e., "i") and the same group of positive or negative statement (i.e., "k"). The processor 204 may be configured to determine the final NLI score by use of the following equations (1), (2), and (3):

$$\text{Final\_score}(j=\text{NEGATIVE})=w_p \cdot \text{avg}\_i(\text{avg}\_k_p(\text{NLI\_score}(i,j,k_p,\text{CON}))+w_n \cdot \text{avg}\_i(\text{avg}\_k_n(\text{NLI\_score}(i,j,k_n,\text{ENT})) \quad (1)$$

$$\text{Final\_score}(j=\text{NEUTRAL})=w_p \cdot \text{avg}\_i(\text{avg}\_k_p(\text{NLI\_score}(i,j,k_p,\text{NEU}))+w_n \cdot \text{avg}\_i(\text{avg}\_k_n(\text{NLI\_score}(i,j,k_n,\text{NEU})) \quad (2)$$

$$\text{Final\_score}(j=\text{POSITIVE})=w_p \cdot \text{avg}\_i(\text{avg}\_k_p(\text{NLI\_score}(i,j,k_p,\text{ENT}))+w_n \cdot \text{avg}\_i(\text{avg}\_k_n(\text{NLI\_score}(i,j,k_n,\text{CON})) \quad (3)$$

Here, "$w_p$" may be weights for a positive statement, "$w_n$" may be weights for a negative statement, "CON" may represent contradiction, "NEU" may represent neutral, and "ENT" may represent entailment. With reference to FIG. 6, the processor 204 may determine whether the input sentence 602 (i.e., "j") is a positive statement or a negative statement. Each input sentence 602 (i.e., "j"), i.e., a premise sentence, followed by the positive statement 604 (i.e., "$K_p$"), i.e., a hypothesis sentence, might determine the intermediate NLI scores as the contradiction_p 608, the neutral_p 610, or the entailment_p 612. In case, the input sentence 602 (i.e., "j"), i.e., a premise sentence, followed by the negative statement 606 (i.e., "$K_n$"), i.e., a hypothesis sentence, might determine the intermediate NLI scores as the contradiction_n 614, the neutral_n 616, or the entailment_n 618. The final NLI score may correspond to the negative label 620, in case the intermediate NLI score for the positive statement 604 (i.e., "$K_p$") and the negative statement 606 (i.e., "$K_n$") are contradiction_p 608 and entailment_n 618 respectively. The final NLI score may correspond to the neutral label 622, in case the intermediate NLI score for the positive statement 604 (i.e., "$K_p$") and the negative statement 606 (i.e., "$K_n$") are neutral_p 610 and neutral_n 616 respectively. The final NLI score may correspond to the positive label 624, in case the intermediate NLI score for the positive statement 604 (i.e., "$K_p$") and the negative statement 606 (i.e., "$K_n$") are entailment_p 612 and entailment_n 618 respectively.

In an embodiment, the processor 204 may be further configured to apply a neural network model on each of the set of hypothesis statements to determine a set of weights associated with the weighted average of the intermediate NLI score. Herein, the final NLI score associated with each sentence of the set of sentences may be determined based on the determined set of weights and the intermediate NLI score associated with the first sentence. Thus, instead of static weighting parameters, a simple neural network model such as, a multi-layer perceptron (MLP), may be applied to determine the weights. The neural network model may use various heuristics to determine the weights.

Figure 7:
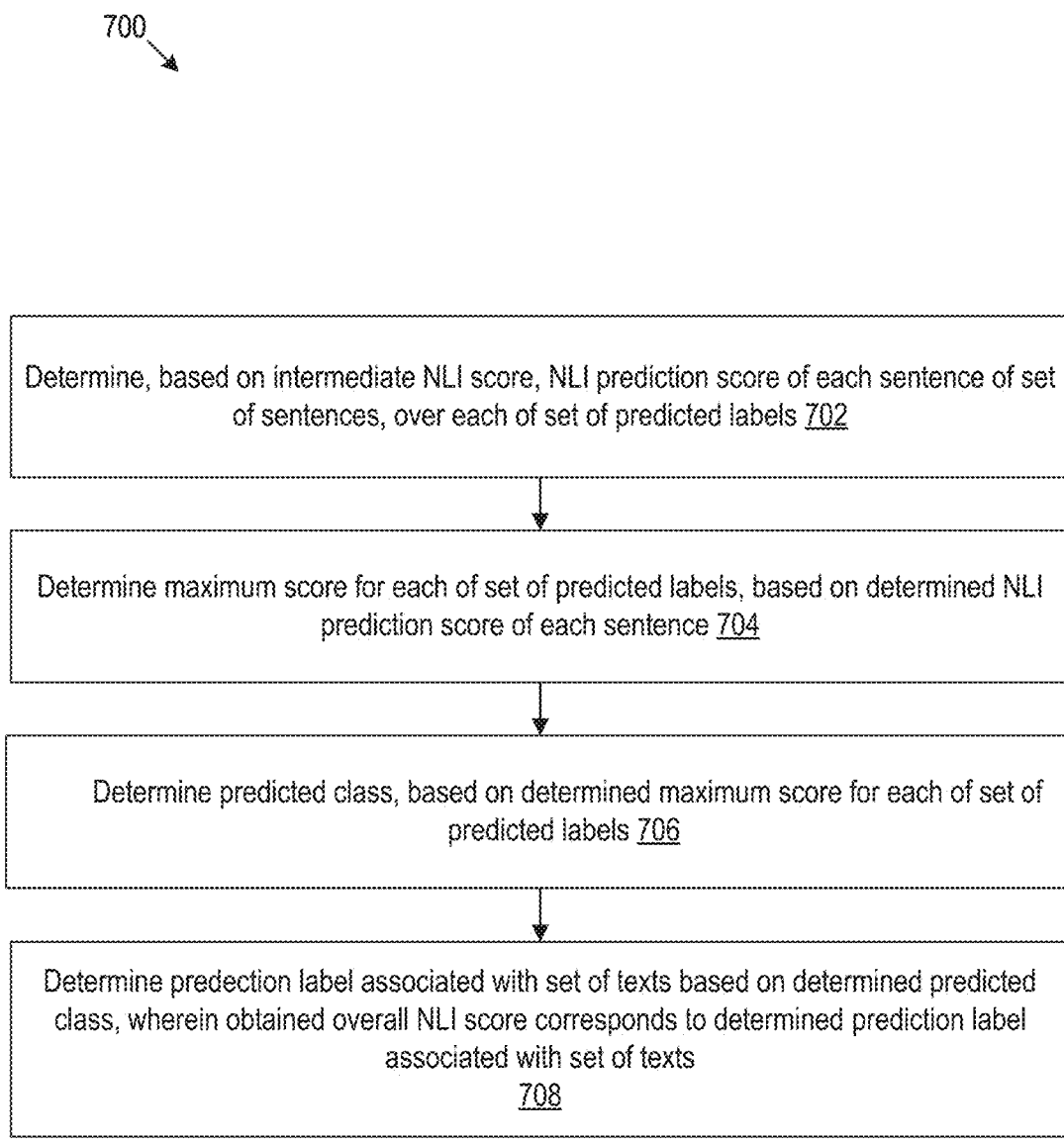
FIG. 7 is a diagram that illustrates a flowchart of an example method for determination of an Prediction label associated with the set of texts.

FIG. 7 is a diagram that illustrates a flowchart of an example method for determination of a predicted label associated with the set of texts, in accordance with at least one embodiment described in the present disclosure. FIG. 7 is described in conjunction with elements from FIG. 1, FIG. 2, FIG. 3, FIG. 4, FIG. 5, and FIG. 6. With reference to FIG. 7, there is shown a flowchart 700. The method illustrated in the flowchart 700 may start at 702 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, an NLI prediction score of each sentence of the set of sentences, may be determined over each of a set of predefined NLI classes, based on the intermediate NLI score. In an embodiment, the processor 204 may be configured to determine, based on the intermediate NLI score, the NLI prediction score of each sentence of the set of sentences, over each of the set of predefined NLI classes. Details related to the determination of the NLI prediction score of each sentence of the set of sentences have been provided, for example, in FIG. 5 and FIG. 6.

At block 704, a maximum score for each of the set of predefined NLI classes may be determined based on the determined NLI prediction score of each sentence. In an embodiment, the processor 204 may be configured to determine the maximum score for each of the set of predefined NLI classes, based on the determined NLI prediction score of each sentence. Herein, the set of predefined NLI classes may be "positive", "negative", or "neutral". In an example, the "positive" class may indicate that the received set of texts 110A states that the resources associated with the received set of texts 110A may be used for commercial purposes. The "negative" class may indicate that the received set of texts 110A states that the resources associated with the received set of texts 110A may not be used for commercial purposes. The "neutral" class may indicate that the received set of texts 110A states that the received set of texts 110A does not specify whether the resources may be used for commercial purposes. The maximum score for each of the "positive", "negative", or "neutral" classes may be obtained based on the determined NLI prediction score of each sentence. Details related to the determination of the maximum score have been provided, for example, in FIG. 9.

At block 706, a predicted class may be determined based on the determined maximum score of each of the set of predefined NLI classes. In an embodiment, the processor 204 may be configured to determine the predicted class, based on the determined maximum score of each of the set of predefined NLI classes. Once the maximum score for each of the set of predefined NLI classes is determined, then the maximum score for each of the set of predefined NLI classes may be compared with one another. The class of the set of predefined NLI classes having the determined maximum score may be determined as the predicted class. Details related to the determination of the predicted class have been provided, for example, in FIG. 9.

At block 708, an Prediction label associated with the set of texts may be determined based on the determined predicted class, wherein the obtained overall NLI score may correspond to the determined Prediction label associated with the set of texts 110A. In an embodiment, the processor 204 may be configured to determine the Prediction label associated with the set of texts 110A based on the determined predicted class. The obtained overall NLI score may correspond to the determined Prediction label associated with the set of texts 110A. Herein, the maximum score of each class (such as, the "positive", the "neutral", or the "negative" class) may be compared over all sentences of the set of texts 110A and a label that has a highest determined maximum score may be assigned as the Prediction label. Details of the determination of the overall NLI score have been described, for example, in FIG. 9. Control may pass to end.

Although the flowchart 700 is illustrated as discrete operations, such as 702, 704, 706, and 708. However, in certain embodiments, such discrete operations may be further divided into additional operations, combined into fewer operations, or eliminated, depending on the particular implementation without detracting from the essence of the disclosed embodiments.

Figure 8:
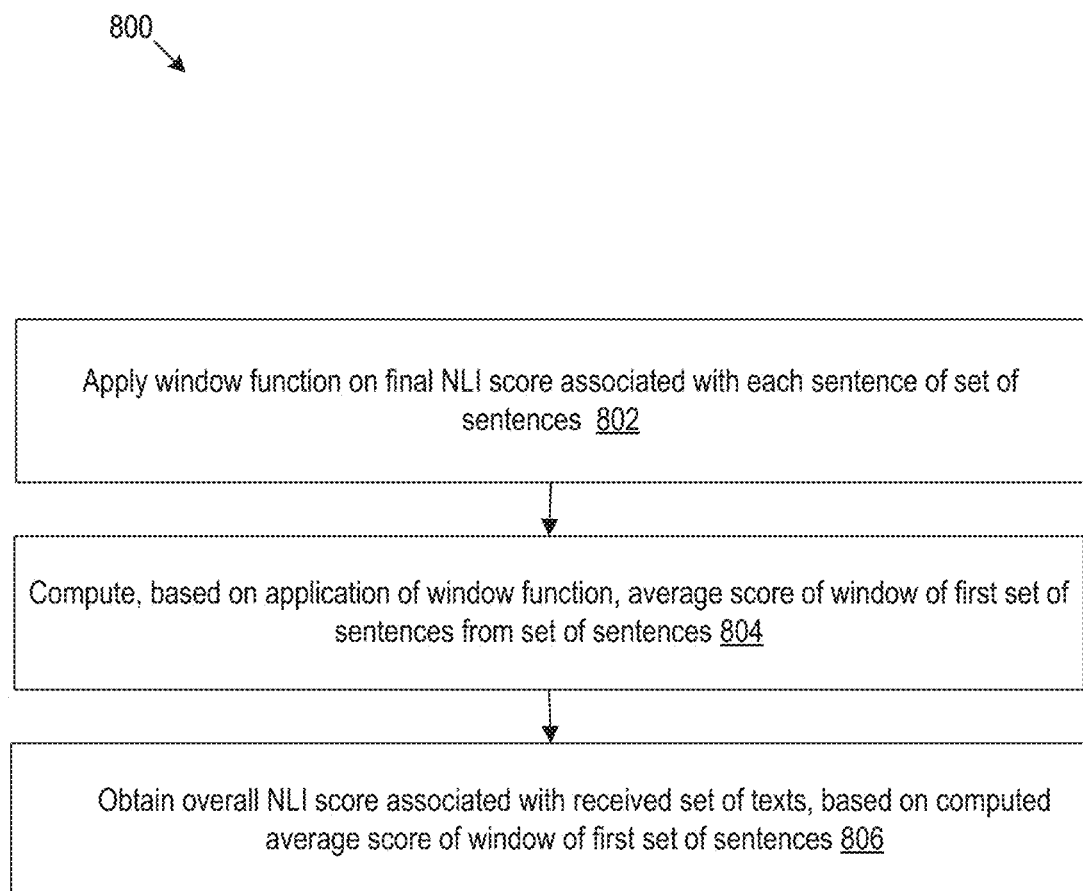
FIG. 8 is a diagram that illustrates flowchart of an example method for determination of an overall NLI score associated with the set of texts.

FIG. 8 is a diagram that illustrates flowchart of an example method for determination of an overall NLI score of each revised label associated with the set of texts, in accordance with at least one embodiment described in the present disclosure. FIG. 8 is described in conjunction with elements from FIG. 1, FIG. 2, FIG. 3, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, a window function may be applied on the final NLI score associated with each sentence of the set of sentences. In an embodiment, the processor 204 may be configured to apply the window function on the final NLI score associated with each sentence of the set of sentences. In an example, the window function may be a Hann window. The window function of a particular size may be applied on the final NLI score associated with each sentence of the set of sentences. For example, the window function of a certain size, such as, five, may be applied on the final NLI score associated with a first sentence to a fifth sentence of the set of sentences. Herein, a first window may include five sentences from the first sentence to the fifth sentence of the set of sentences. Further, a second window may include the next five sentences from the second sentence to the sixth sentence of the set of sentences. The process may be repeated till each of the set of sentences may be processed by the window function.

At block 804, an average score of a window of a first set of sentences from the set of sentences may be computed, based on the application of the window function. In an embodiment, the processor 204 may be configured to compute, based on the application of the window function, the average score of the window of the first set of sentences from the set of sentences. For example, if the window function of size ten is selected, then the first set of sentences include ten sentences, such as, from a first sentence to a tenth sentence of the set of sentences. The final NLI score associated with the first sentence to the tenth sentence of the set of sentences may be averaged. Similarly, the average score of the window of a second set of sentences from the set of sentences comprising a second sentence to an eleventh sentence may be computed based on the application of the window function.

At block 806, the overall NLI score associated with the received set of texts 110A, may be obtained based on the maximum score of the windows of the first set of sentences. In an embodiment, the processor 204 may be configured to obtain the overall NLI score associated with the received set of texts 110A, based on the maximum score of the windows of the first set of sentences. The overall NLI score associated with the received set of texts may be computed based on the maximum score of all windows. Details of the determination of the overall NLI score have been described, for example, in FIG. 9. Control may pass to end.

Although the flowchart 800 is illustrated as discrete operations, such as 802, 804, and 806. However, in certain embodiments, such discrete operations may be further divided into additional operations, combined into fewer operations, or eliminated, depending on the particular implementation without detracting from the essence of the disclosed embodiments.

Figure 9:
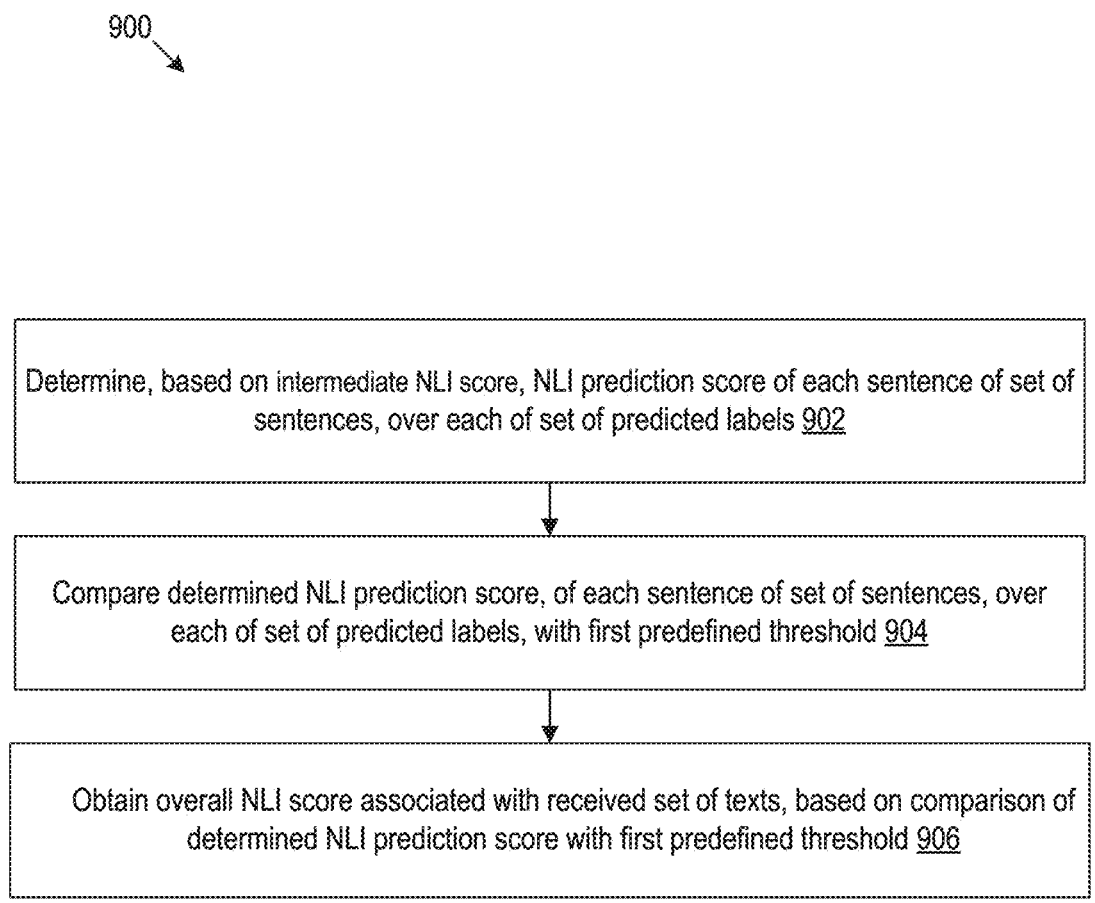
FIG. 9 is a diagram that illustrates a flowchart of an example method for determination of an overall NLI score associated with the set of texts.

FIG. 9 is a diagram that illustrates a flowchart of an example method for determination of an overall NLI score associated with the set of texts, in accordance with at least one embodiment described in the present disclosure. FIG. 9 is described in conjunction with elements from FIG. 1, FIG. 2, FIG. 3, FIG. 4, FIG. 5, FIG. 6, FIG. 7, and FIG. 8. With reference to FIG. 9, there is shown a flowchart 900. The method illustrated in the flowchart 900 may start at 902 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 902, an NLI prediction score of each sentence of the set of sentences may be determined, over each of a set of predefined NLI classes, based on the intermediate NLI score. In an embodiment, the processor 204 may be configured to determine, based on the intermediate NLI score, the NLI prediction score of each sentence of the set of sentences, over each of the set of predefined NLI classes. In an embodiment, the set of predefined NLI classes may be the "positive" class, the "negative" class, and the "neutral" class. The NLI prediction score may be a decimal value.

At block 904, the determined NLI prediction score, of each sentence of the set of sentences, over each of the set of predefined NLI classes may be compared with a first predefined threshold. In an embodiment, the processor 204 may be configured to compare the determined NLI prediction score, of each sentence of the set of sentences, over each of the set of predefined NLI classes, with the first predefined threshold. The first predefined threshold may be a minimum value that the class of the set of predefined NLI classes may have in order to determine the overall NLI score as the class.

At 906, the overall NLI score associated with the received set of texts may be obtained, based on the comparison of the determined NLI prediction score with the first predefined threshold. In an embodiment, the processor 204 may be configured to obtain the overall NLI score associated with the received set of texts, based on the comparison of the determined NLI prediction score with the first predefined threshold. In an example, the set of predefined NLI classes may be the "positive" class, the "negative" class, or the "neutral" class. Herein, if the determined NLI prediction score of each of the set of predefined NLI classes (such as, the "positive", the "neutral", or the "negative" classes) exceeds a threshold, then the overall NLI score may be the class associated with the highest determined maximum score. If the determined NLI prediction score of neither the "positive" class nor the "negative" class is high enough or greater than the threshold, then the overall NLI score may be determined as "neutral" or "not-specified". If the determined NLI prediction score of both the "positive" class and the "negative" class are high or greater than the threshold, then the overall NLI score may be determined as "uncertain" that may need further labelling. In some cases, a MLP may be added as a last layer of the pre-trained NLI model 114 to determine the overall NLI score. Control may pass to end.

Although the flowchart 900 is illustrated as discrete operations, such as 902, 904, and 906, however, in certain embodiments, such discrete operations may be further divided into additional operations, combined into fewer operations, or eliminated, depending on the particular implementation without detracting from the essence of the disclosed embodiments.

Figure 10:
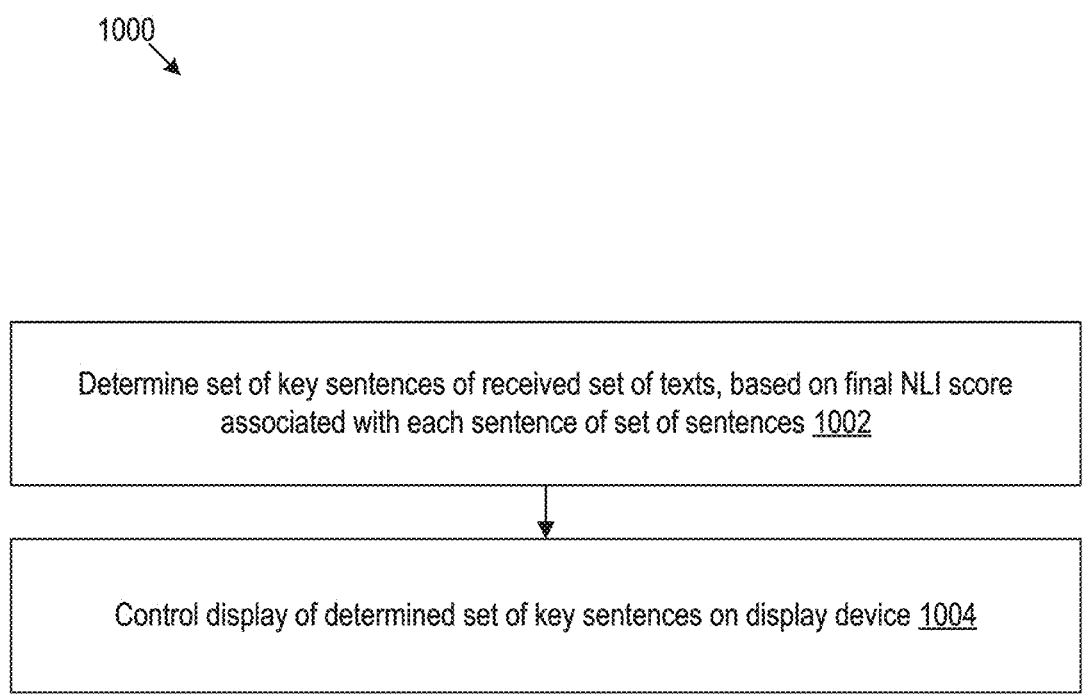
FIG. 10 is a diagram that illustrates a flowchart of an example method for controlling display of determined set of key sentences on a display device.

FIG. 10 is a diagram that illustrates a flowchart of an example method for controlling display of determined set of key sentences on a display device, in accordance with at least one embodiment described in the present disclosure. FIG. 10 is described in conjunction with elements from FIG. 1, FIG. 2, FIG. 3, FIG. 4, FIG. 5, FIG. 6, FIG. 7, FIG. 8, and FIG. 9. With reference to FIG. 10, there is shown a flowchart 1000. The method illustrated in the flowchart 1000 may start at 1002 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 1000 may be divided into additional blocks, combined into fewer blocks, or eliminated, depending on the particular implementation.

At block 1002, a set of key sentences of the received set of texts may be determined based on the final NLI score associated with each sentence of the set of sentences. In an embodiment, the processor 204 may be configured to determine the set of key sentences of the received set of texts, based on the final NLI score associated with each sentence of the set of sentences. The set of key sentences may be sentences that may be most relevant to the determined Prediction label. For example, if the determined Prediction label is "negative", then the set of key sentences may be the sentences that state that the received set of texts may not be used for commercial purposes. Similarly, if the determined Prediction label is "positive", then the set of key sentences may be the sentences that state that the received set of texts may be used for commercial purposes.

At block 1004, the display of the determined set of key sentences on the display device 208A may be controlled. In an embodiment, the processor 204 may be configured to control the display of the determined set of key sentences on the display device 208A. The set of key sentences may be highlighted, for example, color-coded, for the user 118 to confirm the Prediction label or manually assign a label. For example, in the case of a mobile application agreement, the processor 204 may highlight the set of key sentences (or present the set of key sentences as a short summary) instead of a display of the entire mobile application agreement. Thus, the user 118 may not have to read the entire mobile application agreement and may only focus on the set of key sentences presented on the display device 208A. Control may pass to end.

Although the flowchart 1000 is illustrated as discrete operations, such as 1002 and 1004, however, in certain embodiments, such discrete operations may be further divided into additional operations, combined into fewer operations, or eliminated, depending on the particular implementation without detracting from the essence of the disclosed embodiments.

FIG. 11 is a diagram that illustrates an exemplary scenario of a set of key sentences, in accordance with at least one embodiment described in the present disclosure. FIG. 11 are described in conjunction with elements from FIG. 1, FIG. 2, FIG. 3, FIG. 4, FIG. 5, FIG. 6, FIG. 7, FIG. 8, FIG. 9, and FIG. 10. With reference to FIG. 11, there is shown an exemplary scenario 1100. The scenario 1100 may include a set of key sentences comprising a first sentence 1104, a second sentence 1106, and a third sentence 1108.

With reference to FIG. 11, the first sentence 1104 may state, "Participants cannot share data to anyone outside their team.". The second sentence 1106 may state, "During the competition, participants are not allowed to share source or codes developed for competition privately. Participants found indulging in private sharing of the data may be disqualified." The third sentence 1108 may state, "Users will not use data other than the data provided for the competition purpose.". The processor 204 may be configured to control the display of the determined set of key sentences 1102 on the display device 208A. Thus, the user 118 may not have to read the entire license agreement text and may only focus on the set of key sentences 1102 presented on the display device 208A. Herein, based on a review of the determined set of key sentences 1102, the user 118 may infer that the data may not be used for commercial purposes.

It should be noted that the scenario 1100 of FIG. 11 is for exemplary purposes and should not be construed to limit the scope of the disclosure.

Figure 12:
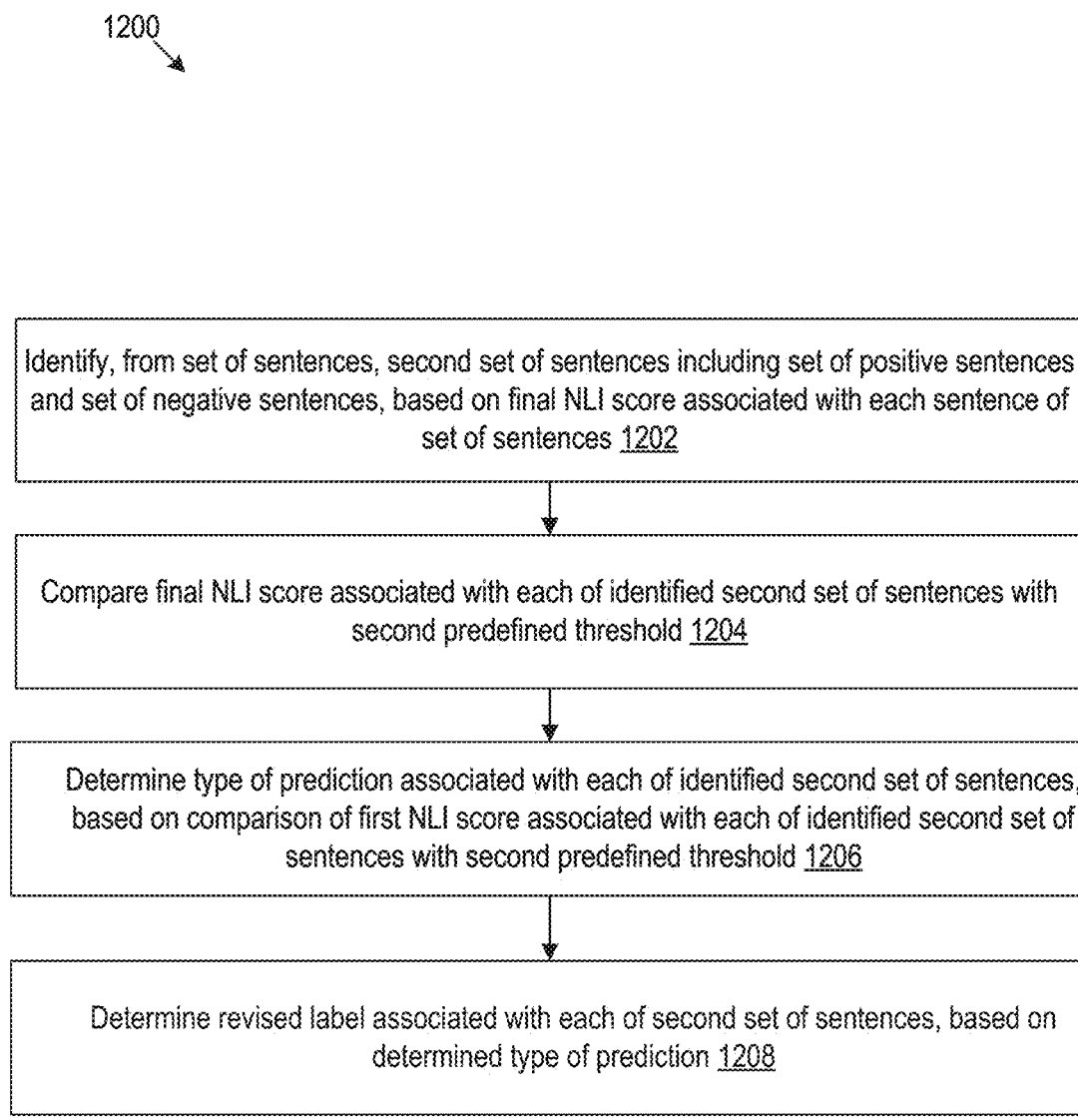
FIG. 12 is a diagram that illustrates a flowchart of an example method for determination of a revised label.

FIG. 12 is a diagram that illustrates a flowchart of an example method for determination of a revised label, in accordance with at least one embodiment described in the present disclosure. FIG. 12 is described in conjunction with elements from FIG. 1, FIG. 2, FIG. 3, FIG. 4, FIG. 5, FIG. 6, FIG. 7, FIG. 8, FIG. 9, FIG. 10, and FIG. 11. With reference to FIG. 12, there is shown a flowchart 1200. The method illustrated in the flowchart 1200 may start at 1202 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 1200 may be divided into additional blocks, combined into fewer blocks, or eliminated, depending on the particular implementation.

At block 1202, a second set of sentences including a set of positive sentences and a set of negative sentences may be identified from the set of sentences, based on the final NLI score associated with each sentence of the set of sentences. In an embodiment, the processor 204 may be configured to identify, from the set of sentences, the second set of sentences including the set of positive sentences and the set of negative sentences, based on the final NLI score associated with each sentence of the set of sentences. In an embodiment, the processor 204 may identify the second set of sentences from the set of sentences, based on the final NLI score indicative of a high confidence of a predicted label for the second set of sentences. In an example, the processor 204 may compare a difference between a highest determined NLI prediction score and second highest determined NLI prediction score with a threshold. The identified second set of sentences may correspond to a set of key sentences that may be include the set of positive or negative sentences. Alternatively, a human may extract the set of positive or negative sentences by manually labeling some sentences such as, the set of key sentences.

At block 1204, the final NLI score associated with each of the identified second set of sentences may be compared with a second predefined threshold. In an embodiment, the processor 204 may be configured to compare the final NLI score associated with each of the identified second set of sentences with a second predefined threshold. Herein, the second predefined threshold may be a parameter for measurement of determination of a type of prediction. The final NLI score associated with each of the identified second set of sentences may be computed and may be compared with the second predefined threshold to determine the type of prediction. Details of the computation of the final NLI score are further described, for example, in FIG. 5.

At block 1206, a type of prediction associated with each of the identified second set of sentences may be determined, based on the comparison of the first NLI score, associated with each of the identified second set of sentences, with the second predefined threshold. In an embodiment, the processor 204 may be configured to determine the type of prediction associated with each of the identified second set of sentences, based on the comparison of the first NLI score, associated with each of the identified second set of sentences, with the second predefined threshold.

In an embodiment, the determined type of prediction may be one of a rule-based prediction, a conflicted prediction, or an uncertain prediction. The set of positive or negative sentences may be used as a "rule-based" prediction. That is, if the identified second set of sentences includes the set of positive or negative sentences, then the overall NLI score may correspond to a positive label or negative label, respectively. In case the first NLI score, associated with each of the set of positive sentences is above the second predefined threshold then the overall NLI score may correspond to a positive label and in case the first NLI score, associated with each of the set of negative sentences is above the second predefined threshold then the overall NLI score may correspond to a negative label. It may be noted that in cases which the second set of sentences include both the set of positive and the set of negative sentences, the type of prediction may be "conflicted". Herein, it may not be determined whether or not the received set of texts 110A may or may not be used for commercial purposes. For example, the set of positive sentences of the received set of texts 110A may state that the associated resources may be used for commercial purposes, while the set of negative sentences of the received set of texts 110A may state that the associated resources may not be used for commercial purposes. Thus, in case, the first NLI score associated with each of the set of positive sentences and the set of negative sentences are above the second predefined threshold, the type of prediction may be "conflicted". In case, the comparison of the first NLI score, associated with each of the set of positive sentences and the set of negative sentences are below the second predefined threshold then the type of prediction may be "uncertain".

At block 1208, a revised label associated with each of the second set of sentences may be determined based on the determined type of prediction. In an embodiment, the processor 204 may be configured to determine a revised label associated with each of the second set of sentences, based on the determined type of prediction. In an example, the revised label may be "non-commercial", "not specified", or "commercial". The revised label may be "non-commercial" when the second set of sentences specify that the resources associated with the received set of texts 110A may not be used for commercial purposes. The revised label may be "commercial" when the second set of sentences specify that the resources associated with the received set of texts 110A may be used for commercial purposes. The revised label may be "non-specified" when the second set of sentences does not specify whether the resources associated with the received set of texts 110A may or may not be used for commercial purposes.

In an embodiment, the determined revised label is further based on a user input and the determined type of prediction being the uncertain prediction. Herein, the second set of sentences may be displayed on the display device 208A, and the user 118 may go through the second set of sentences to determine the revised label. The user 118 may analyze the second set of sentences to determine whether the revised label corresponds to a "non-commercial" label, a "non-specified" label, or a "commercial" label. The revised label that is determined manually may be called as a ground-truth. Control may pass to end.

Although the flowchart 1200 is illustrated as discrete operations, such as 1202, 1204, 1206, and 1208 however, in certain embodiments, such discrete operations may be further divided into additional operations, combined into fewer operations, or eliminated, depending on the particular implementation without detracting from the essence of the disclosed embodiments.

Figure 13:
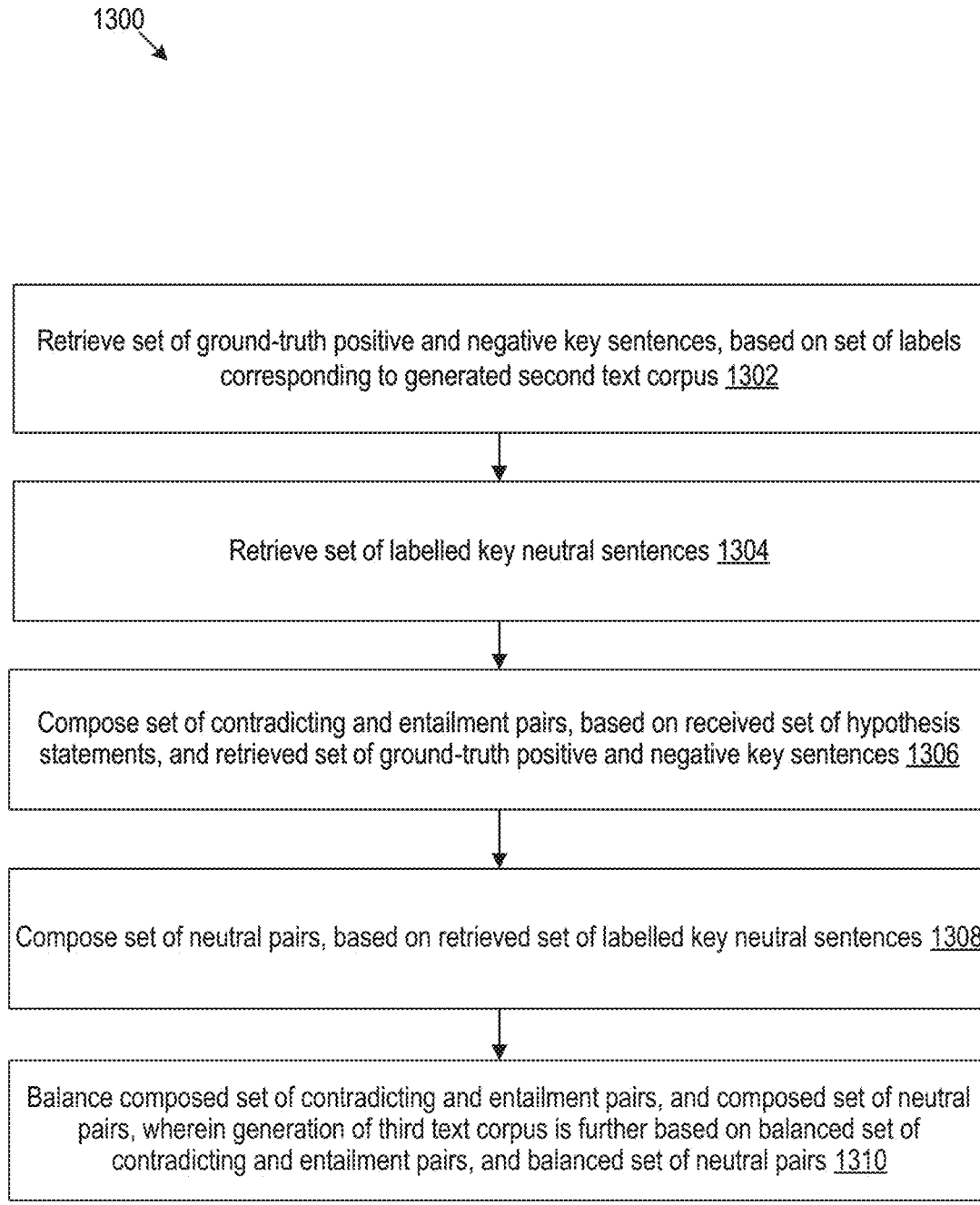
FIG. 13 is a diagram that illustrates a flowchart of an example method for balancing composed set of contradicting and entailment pairs.

FIG. 13 is a diagram that illustrates a flowchart of an example method for balancing composed set of contradicting and entailment pairs, in accordance with at least one embodiment described in the present disclosure. FIG. 13 is described in conjunction with elements from FIG. 1, FIG. 2, FIG. 3, FIG. 4, FIG. 5, FIG. 6, FIG. 7, FIG. 8, FIG. 9, FIG. 10, FIG. 11, and FIG. 12. With reference to FIG. 13, there is shown a flowchart 1300. The method illustrated in the flowchart 1300 may start at 1302 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 1300 may be divided into additional blocks, combined into fewer blocks, or eliminated, depending on the particular implementation.

At block 1302, a set of ground-truth positive and negative key sentences may be retrieved based on the set of labels corresponding to the generated second text corpus. In an embodiment, the processor 204 may be configured to retrieve the set of ground-truth positive and negative key sentences, based on the set of labels corresponding to the generated second text corpus. Herein, when the determined revised label is same as the ground-truth and the final NLI score associated with the set of positive and the set of negative sentences is greater than a threshold, then the set of ground-truth positive and negative key sentences may be the set of positive sentences and the set of negative sentences, respectively. When the determined revised label is same as the ground-truth and the final NLI score associated with the set of positive and the set of negative sentences is lesser than the threshold, then the set of ground-truth positive and negative key sentences may be determined manually based on labelling of each of the set of key sentences as a positive sentence or a negative sentence. When the determined revised label is different from the ground truth, then the set of ground-truth positive and negative key sentences may be also determined manually based on labelling of each of the set of key sentences as a positive sentence or a negative sentence.

In an example, the set of ground-truth negative sentences may include following sentences:

"Essentially, the license prohibits any commercial use of the dataset. They may be used for non-commercial research purposes, but they may not be re-published without the express permission of a company 'X'. Permission to copy, modify, and distribute the data, and the copyrightable expressions that include the data is granted by company 'X' solely for educational, non-profit research, and non-profit commercial purposes, without fee, provided that the above copyright notice appears on all copies that are distributed, and this license accompanies the distribution. You agree that, except as permitted or contemplated by this agreement, you will not reproduce, duplicate, distribute, disseminate, grant access to others, sell, resell, rent or trade the licensed content (or any part thereof) for any purpose. You agree not to transmit, duplicate, publish, redistribute or otherwise provide or make available the data to any party not participating in the competition. The data provided, or any derivative thereof, shall not be disclosed by participant to any third party and may not be copied or used by participant for any purpose other than to participate, in accordance with the applicable competition rules, in the competition for which such data was provided. By participating in this challenge, the participants acknowledges that the datasets are provided for the purpose of the competition only. Unless otherwise restricted under the competition specific rules above, you may access and use the competition data for non-commercial purposes only, including for participating in the competition and on a first forum, and for academic research and education. You acknowledge and agree not to share any source data, including the corpus and product catalogue, provided through the competition to parties other than yourself. You may access and use the competition data for non-commercial purposes only, including for participating in the competition and on the first forums, and for academic research and education. Participants will not use the data for commercial purposes. You will not use or access the data for any commercial, gambling, or illegal purpose; copy, modify, reproduce, license, sublicense, distribute, transmit, republish, exhibit, or display the data (except to the extent copying, modifying, reproducing or displaying is necessary and directly related to your participation in the competition); remove, obscure, or modify any copyright notices or other notices, designations, or attributions within the data; or use any marks or any copyright or other proprietary rights associated with the data; or all names, trademarks, logos, symbols, designations, emblems, designs, and trade dress of the data, together with all identifications, labels, insignia or indicia thereof, for any purpose without the express written consent of company 'X'. You will not: use or access the data 'A' for any commercial, gambling, or illegal purpose; copy, modify, reproduce, license, sublicense, distribute, transmit, republish, exhibit, or display the data 'A' (except to the extent copying, modifying, reproducing or displaying is necessary and directly related to your participation in the competition; remove, obscure, or modify any copyright notices or other notices, designations, or attributions within the data 'A'; or use any data 'A' marks or any copyright or other proprietary rights associated with the data 'A' for any purpose without the express written consent of company 'X'. You may access and use the competition data for non-commercial purposes only, including for participating in the competition and on the first forum, and for academic research and education. You will use the data only for non-commercial research and educational purposes. You agree not to transmit, duplicate, publish, redistribute or otherwise provide or make available the competition data to any party not participating in the competition. Participants in the data science theme may access and use the competition data only for participating in the data science theme and on the first forums. Unless otherwise permitted by the terms of the competition website, participants must use the data solely for the purpose and duration of the competition, including but not limited to reading and learning from the data, analyzing the data, modifying the data and generally preparing your submission and any underlying models and participating in forum discussions on the website. In consideration of the terms and conditions of this agreement, and for other good and valuable consideration, the receipt and sufficiency of which is acknowledged, during and after the term of this agreement participant will: use the disclosing party's confidential information solely for the purpose for which it is provided. Unless otherwise restricted under the competition specific rules above, after your acceptance of these rules, you may access and use the competition data for the purposes of the competition, participation on first website forums, academic research and education, and other non-commercial purposes. The data set may not be presented or hosted anywhere else, whether printed, electronic or broadcast. Use of dataset outside the of competition is limited."

In an example, the set of ground-truth positive sentences may include following sentences:
"You may access and use the competition data for any purpose, whether commercial or non-commercial, including for participating in the competition and on the first forum, and for academic research and education. You may access and use the competition data for any purpose, whether commercial or non-commercial, including for participating in the competition and on the first forum, and for academic research and education. You may access and use the competition data for any purpose, whether commercial or non-commercial, including for participating in the competition and on the first forum, and for academic research and education. You may access and use the competition data for any purpose, whether commercial or non-commercial, including for participating in the competition and on the first forum, and for academic research and education. You may access and use the competition data for any purpose, whether commercial or non-commercial, including for participating in the competition and on the first forum, and for academic research and education, as long as you provide attribution for the dataset and the individual items (sound files) when required."

At block 1304, a set of labelled key neutral sentences may be retrieved. In an embodiment, the processor 204 may be configured to retrieve the set of labelled key neutral sentences. The set of labelled key neutral sentences may be neutral in sense and may not state whether or not the resources associated with the received set of texts 110A may or may not be used for commercial purposes. That is, neutral sentences may be obscure in meaning with respect to the determination whether the resources may be used for commercial purposes or not. Such sentences and may be labelled as "neutral", based on manual judgement.

In an example, a set of labelled key neutral sentences may include following sentences:
"All the available data may be used. External data may be used, but must be clearly pointed to in the appropriate forum thread ("external data") at least one week prior to the end of the contest and must meet the following criteria: you can use whatever extra data or prebuilt models you like, you can use any resource you want for data, and the evaluation data (consisting of gestures recorded by the organizers with a first sensor) will be made available for purchase to the registered participants on data media, delivered by a mail carrier, at the participants\u2019 cost, and will also be made available for download over the Internet at no cost to the participants."

At block 1306, a set of contradicting and entailment pairs may be composed based on the received set of hypothesis statements 112, and the retrieved set of ground-truth positive and negative key sentences. In an embodiment, the processor 204 may be configured to compose the set of contradicting and entailment pairs, based on the received set of hypothesis statements 112, and the retrieved set of ground-truth positive and negative key sentences. Herein, the processor 204 may compose the entailment pair when the premise is a positive sentence, and the hypothesis is a positive key sentence. Further, the processor 204 may compose the entailment pair when the premise is a negative key sentence, and the hypothesis is a negative key sentence. The processor 204 may compose the contradiction pair when the premise is a positive key sentence, and the hypothesis is a negative key sentence. The processor 204 may also compose the contradiction pair when the premise is a negative key sentence, and the hypothesis is a negative key sentence.

At block 1308, a set of neutral pairs may be composed based on the retrieved set of labelled key neutral sentences. In an embodiment, the processor 204 may be configured to compose the set of neutral pairs, based on the retrieved set of labelled key neutral sentences. The processor 204 may compose the neutral pair when the premise is a neutral sentence, and the hypothesis is a positive sentence. Further, the processor 204 may compose the neutral pair when the premise is a neutral sentence, and the hypothesis is a negative sentence.

At block 1310, the composed set of contradicting and entailment pairs, and the composed set of neutral pairs may be balanced, Herein, the generation of the third text corpus, may be further based on the balanced set of contradicting and entailment pairs, and the balanced set of neutral pairs. In an embodiment, the processor 204 may be configured to balance the composed set of contradicting and entailment pairs, and the composed set of neutral pairs, wherein the generation of the third text corpus, may be further based on the balanced set of contradicting and entailment pairs, and the balanced set of neutral pairs. When the number of pairs of each type, such as, "contradiction", "neutral" and "entailment" types are not the same, the processor 204 may extract more samples from the third text corpus (such as, the third text corpus 310A of FIG. 3). For example, in a case, a number of neutral pairs is less than the number of contradicting and entailment pairs, the set of contradicting-entailment pairs and the set of neutral pairs may not be balanced. In such case, to balance the classes, sentences that may be "not-specified" in the third text corpus (such as, the third text corpus 310A of FIG. 3) may be taken as the premise and combined with "positive" or "negative" hypothesis statements to form the neutral pairs. It may be noted that it may be possible to expand more training data not only from the third text corpus (such as, the third text corpus 310A of FIG. 3) but also from the second text corpus (such as, the second text corpus 308A of FIG. 3). It may be noted that the balanced set of contradicting-entailment pairs and the balanced set of neutral pairs may be used as a training corpus to fine-tune the pre-trained NLI model 114, based on the few-shot learning model 116. Control may pass to end.

Although the flowchart 1300 is illustrated as discrete operations, such as 1302, 1304, 1306, 1308, and 1310, however, in certain embodiments, such discrete operations may be further divided into additional operations, combined into fewer operations, or eliminated, depending on the particular implementation without detracting from the essence of the disclosed embodiments.

Figure 14:
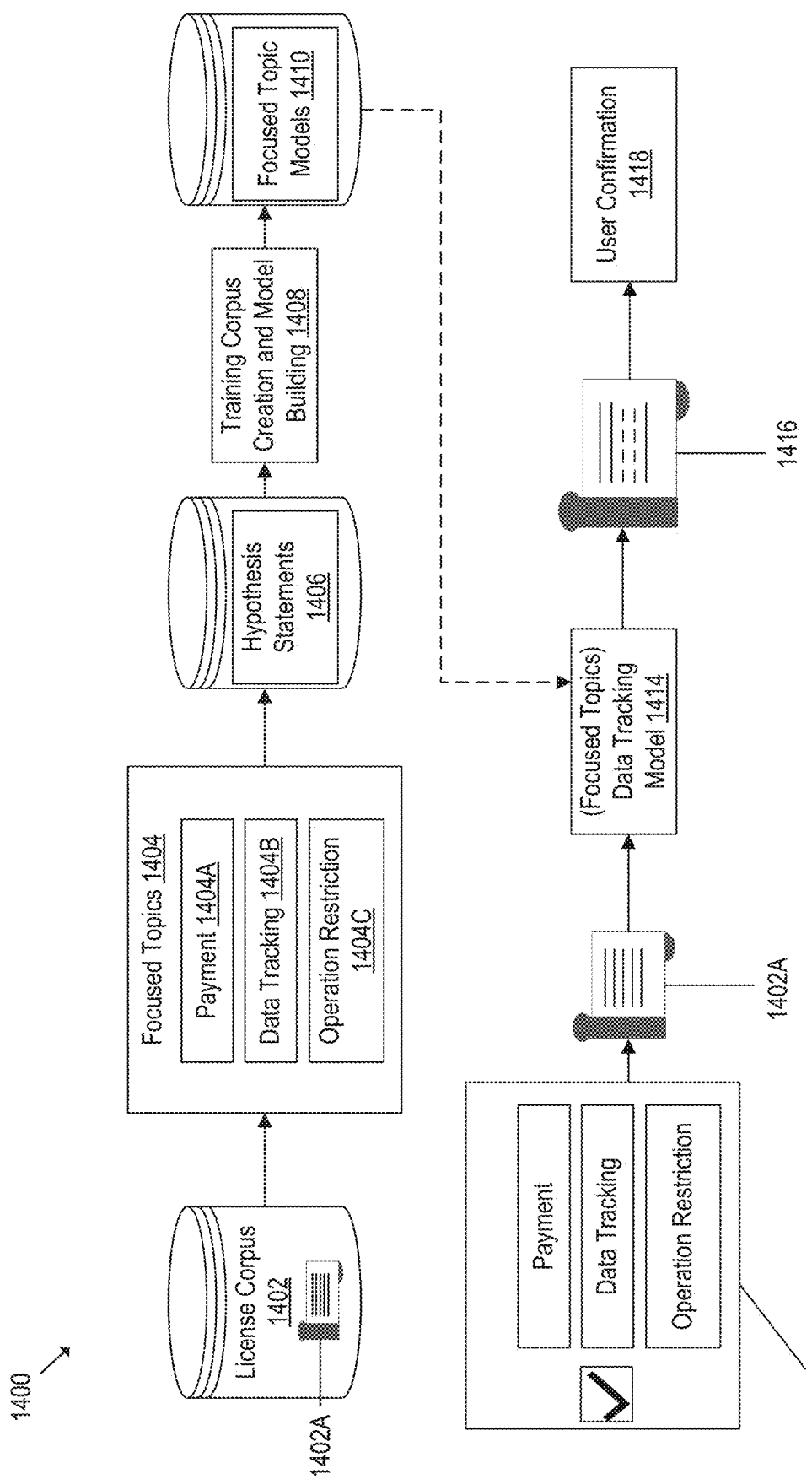
FIG. 14 is a diagram that illustrates an exemplary scenario of an auto-acceptance of terms and conditions associated with an application program.

FIG. 14 is a diagram that illustrates an exemplary scenario of an auto-acceptance of terms and conditions associated with an application program, in accordance with at least one embodiment described in the present disclosure. FIG. 14 is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13. With reference to FIG. 14, there is shown an exemplary scenario 1400. The scenario 1400 may include an application program (not shown in FIG. 14) that may be installed and executed on an electronic device (e.g., a mobile phone, a laptop, tablet computer, a consumer electronic device, or a desktop computer) associated with the user 118. The scenario 1400 may include a set of key sentences comprising a license corpus 1402 comprising a legal agreement text 1402A. The scenario 1400 may further include focused topics 1404, hypothesis statements 1406, focused topic models 1410, a user interface 1412, (focused topics) data tracking model 1414, and a highlighted legal agreement text 1416. The focused topics 1404 may include a payment 1404A, a data tracking 1404B, and an operation restriction 1404C. The scenario 1400 may include operations such as, training corpus creation and model building 1408 and user confirmation 1418.

With reference to FIG. 14, the processor 204 may receive the legal agreement text 1402A from the license corpus 1402 and may classify the received legal agreement text 1402A into the focused topics 1404. The focused topics 1404 may include topics that may be of most common interest to users. The legal agreement text 1402A may be classified into the focused topics 1404 either manually based on human input or by use of a machine learning model. The legal agreement text 1402A may be classified into focus topics, such as, the payment 1404A, the data tracking 1404B, and the operation restriction 1404C. The payment 1404A may include texts from the legal agreement text 1402A that may be relevant to payment. The data tracking 1404B may include texts from the legal agreement text 1402A that may specify how data of the users may be tracked. The operation restriction 1404C may include texts from the legal agreement text 1402A that may specify agreements associated with an operation of the application program. The processor 204 may extract the hypothesis statements 1406 relevant to the legal agreement text 1402A and one or multiple focused topics 1404.

At 1408, an operation for training corpus creation and model building may be executed. Herein, NLI models for each of the payment 1404A, the data tracking 1404B, and the operation restriction 1404C may be trained. The processor 204 may display the user interface 1412 on the display device 208A. The user, such as, the 118 of FIG. 1, may interact with the display device 208A to select a topic of interest from the focused topics 1404. For example, as shown in FIG. 14, the user 118 may select a topic, such as, data tracking, on the user interface 1412. The legal agreement text 1402A may be retrieved and the processor 204 may apply the (focused topics) data tracking model 1414 on the legal agreement text 1402A to identify sentences that state the data associated with the user may be tracked. The (focused topics) data tracking model 1414 may identify the identify sentences that state the data associated with the user may be tracked. Thereafter, the processor 204 may highlight the identified sentences and may present the highlighted legal agreement text 1416 to the user. The user may go through the identified sentences of the highlighted legal agreement text 1416 and may confirm (at operation for user confirmation 1418) whether or not the user agrees to accept the legal agreement text 1402A. Thus, the user may not have to go through each sentence of the legal agreement text 1402A and may only read the identified sentences, which may correspond to key sentences from the legal agreement text 1402A. The presentation of the key sentences of the legal agreement text 1402A to the user 118 may help in auto-acceptance of the legal agreement text 1402A.

It should be noted that the scenario 1400 of FIG. 14 is for exemplary purposes and should not be construed to limit the scope of the disclosure.

Figure 15:
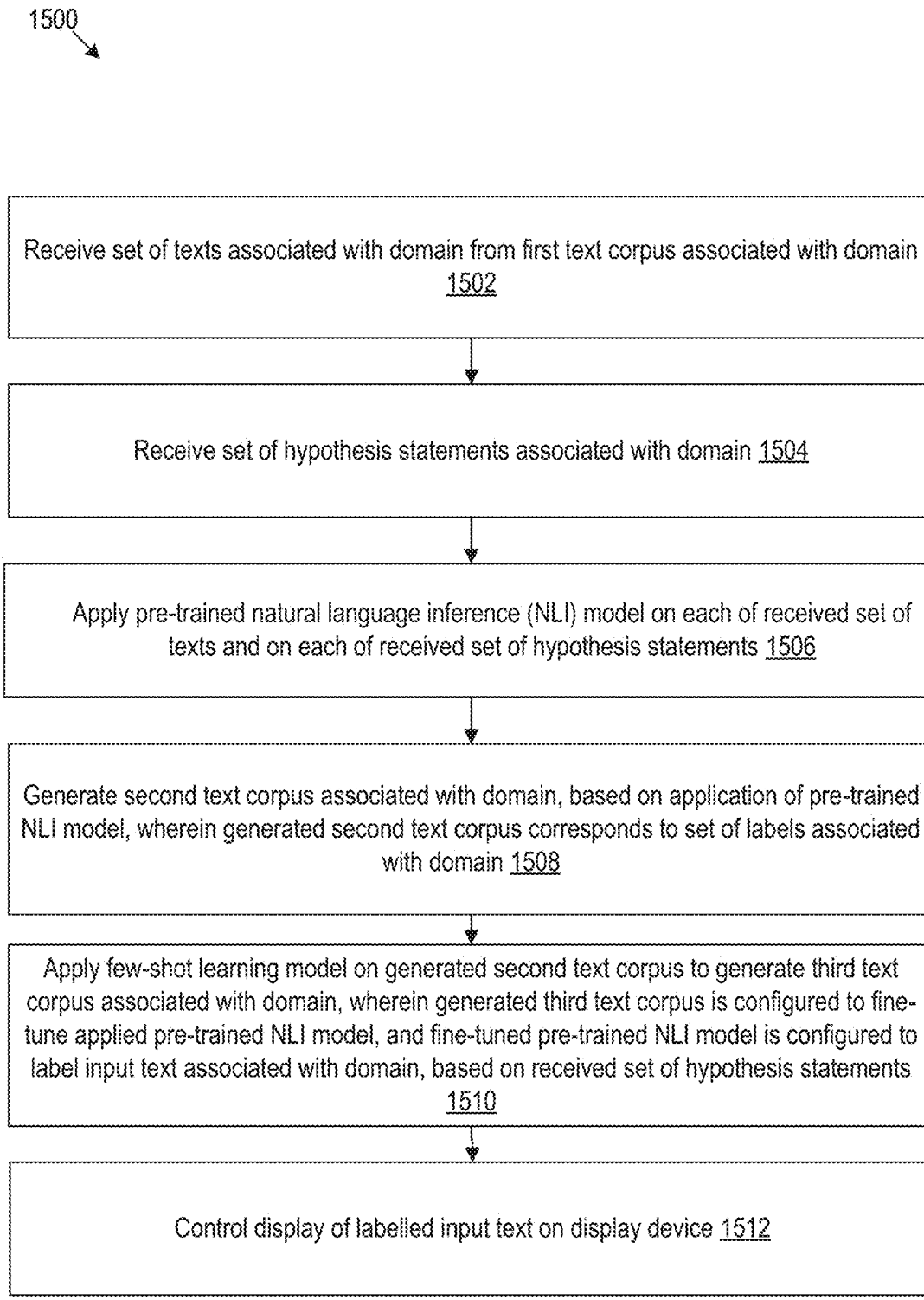
FIG. 15 is a diagram that illustrates a flowchart of an example method for domain-specific text labelling using natural language inference model, all according to at least one embodiment described in the present disclosure.

FIG. 15 is a diagram that illustrates a flowchart of an example method for domain-specific text labelling using natural language inference model, in accordance with at least one embodiment described in the present disclosure. FIG. 15 is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14. With reference to FIG. 15, there is shown a flowchart 1500. The method illustrated in the flowchart 1500 may start at 1502 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 1500 may be divided into additional blocks, combined into fewer blocks, or eliminated, depending on the particular implementation.

At block 1502, the set of texts 110A associated with the domain may be received from the first text corpus 110 associated with the domain. The processor 204 may be configured to receive the set of texts 110A associated with the domain from the first text corpus 110 associated with the domain. The processor 204 may request the database 106 for the set of texts 110A from the first text corpus 110 associated with the domain. The database 106 may verify the authenticity of the request and may provide the set of texts 110A associated with the domain to the processor 204.

At block 1504, the set of hypothesis statements 112 associated with the domain may be received. The processor 204 may be configured to receive the set of hypothesis statements 112 associated with the domain. It may be noted that to apply the pre-trained NLI model 114 to the specific domain, appropriate set of hypothesis statements 112, that may be considered as query sentences, may need to be provided. Details related to the set of hypothesis statements 112 are further described, for example, in FIG. 3.

At block 1506, the pre-trained NLI model 114 may be applied on each of the received set of texts 110A and on each of the received set of hypothesis statements 112. The processor 204 may be configured to apply the pre-trained natural language inference (NLI) model 114 on each of the received set of texts 110A and on each of the received set of hypothesis statements 112. Details related to the application of the pre-trained NLI model 114 are further described, for example, in FIG. 5.

At block 1508, the second text corpus 308A associated with the domain may be generated based on the application of the pre-trained NLI model 114. The processor 204 may be configured to generate the second text corpus (such as, the second text corpus 308A of FIG. 3) associated with the domain, based on the application of the pre-trained NLI model 114. The generated second text corpus may be smaller in size than the first text corpus 110 and may be labelled. The set of labels associated with the domain may include sentences for the user 118 to confirm a label or manually update a label. Details related to the second text corpus generation are further described, for example, in FIG. 5 and FIG. 6.

At block 1510, the few-shot learning model may be applied on the generated second text corpus 308A to generate the third text corpus 310A associated with the domain. The processor 204 may be configured to apply the few-shot learning model on the generated second text corpus (such as, the generated second text corpus 308A of FIG. 3) to generate the third text corpus (such as, the third text corpus 310A of FIG. 3) associated with the domain. Details related to the third text corpus 310A generation are further described, for example, in FIG. 13.

At block 1512, the display of the labelled input text on the display device 208A may be controlled. The processor 204 may be configured to control the display of the labelled input text (such as, the labelled input text 312A of FIG. 3) on the display device 208A. The labelled input text may be displayed on the display device so that the user may make confirmations. Details related to the display of the labelled input text on the display device 208A further described, for example, in FIG. 3. Control may pass to end.

Although the flowchart 1500 is illustrated as discrete operations, such as 1502, 1504, 1506, 1508, 1510, and 1512, however, in certain embodiments, such discrete operations may be further divided into additional operations, combined into fewer operations, or eliminated, depending on the particular implementation without detracting from the essence of the disclosed embodiments.

Experimental Data

In an experimental implementation of the disclosure, labelled data included license text data of 161 competitions and unseen data included license text data for 101 competitions. Exemplary experiment data of the performance evaluation for the conducted experiment is presented in Table 1, as follows

TABLE 1

Exemplary performance evaluation of
the conducted of the disclosure

|  | Labelled data | Unseen data |
| --- | --- | --- |
| Rule-based | 44.72% | 78.21% |
| Zero-Shot NLI | 46.58% | 85.15% |
| Few-Shot NLI | 77.01% | 91.09% |

For example, from the Table 1, it may be observed that an accuracy obtained using a rule-based algorithm for the labeled data and unseen data may be 44.72 percent and 78.21 percent, respectively. The accuracy obtained using a zero-shot NLI for the labeled data and unseen data may be 46.58 percent and 85.12 percent, respectively. The accuracy obtained using a few-shot NLI for the labeled data and unseen data may be 77.01 percent and 91.09 percent, respectively.

It should be noted that data provided in Table 1 may merely be taken as experimental data and may not be construed as limiting the present disclosure.

An exemplary experiment data of the statistics of prediction results for the conducted experiment is presented in Table 2, as follows:

TABLE 2

Exemplary experimental data of statistics of prediction results

|  | Non-Commercial | No-Specified | Commercial | Uncertain |
| --- | --- | --- | --- | --- |
| Rule-based | 242 | 5127 | 35 | 2 |
| Zero-Shot NLI | 152 | 4727 | 14 | 377 |
| Few-Shot NLI | 452 | 4954 | 0 | 0 |

It should be noted that data provided in Table 2 may merely be taken as experimental data and may not be construed as limiting the present disclosure.

Various embodiments of the disclosure may provide one or more non-transitory computer-readable storage media configured to store instructions that, in response to being executed, cause a system (such as, the example electronic device 102) to perform operations. The operations may include reception of a set of texts (such as, the set of texts 110A of FIG. 1) associated with a domain from a first text corpus (such as, the first text corpus 110 of FIG. 1) associated with the domain. The operations may include reception of a set of hypothesis statements (such as, the set of hypothesis statements of FIG. 1) associated with the domain. The operations may further include application of pre-trained natural language inference (NLI) model (such as, the pre-trained NLI model 114 of FIG. 1) on each of the received set of texts and on each of the received set of hypothesis statements. The operations may further include generation of a second text corpus (such as, the second text corpus 308A of FIG. 3) associated with the domain, based on the application of the pre-trained NLI model, wherein the generated second text corpus may correspond to a set of labels associated with the domain. The operations may further include application of a few-shot learning model on the generated second text corpus to generate a third text corpus (such as, the third text corpus 310A of FIG. 3) associated with the domain, wherein the generated third text corpus may be configured to fine-tune the applied pre-trained NLI model, and the fine-tuned NLI model may be configured to label an input text associated with the domain, based on the received set of hypothesis statements. The operations may further include controlling a display of the labelled input text on a display device (such as, the display device 208A of FIG. 2).

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
receiving a set of texts associated with a domain from a first text corpus associated with the domain;
receiving a set of hypothesis statements associated with the domain;
applying a pre-trained natural language inference (NLI) model on each of the received set of texts and on each of the received set of hypothesis statements;
generating a second text corpus associated with the domain, based on the application of the pre-trained NLI model, the generated second text corpus corresponds to a set of labels associated with the domain; and
applying a few-shot learning model on the generated second text corpus to generate a third text corpus associated with the domain,
the generated third text corpus is configured to fine-tune the applied pre-trained NLI model, and
the fine-tuned NLI model is configured to label an input text associated with the domain, based on the received set of hypothesis statements;
controlling a display of the labelled input text on a display device;
selecting a first sentence from a set of sentences associated with the received set of texts, as a premise;
controlling an execution of a first set of operations to compute a final NLI score associated with each sentence of the set of sentences, the first set of operations includes:
for each hypothesis statement from the set of hypothesis statements:
applying the pre-trained NLI model on the selected first sentence and on the corresponding hypothesis statement, and
determining an intermediate NLI score associated with the selected first sentence, based on the application of the pre-trained NLI model on the selected first sentence and on the corresponding hypothesis statement, and
determining whether all sentences in the set of sentences are processed for the computation of the final NLI score, and
selecting, as the first sentence, a second sentence from the set of sentences, based on a determination that at least one sentence in the set of sentences is unprocessed; and
computing the final NLI score associated with each sentence of the set of sentences to obtain an overall NLI score associated with the received set of texts, based on an iterative control of the execution of the first set of operations.

2. The method according to claim 1, wherein the set of hypothesis statements associated with the domain include at least one of a positive hypothesis statement, a neutral hypothesis statement, or a negative hypothesis statement.

3. The method according to claim 1, wherein the final NLI score associated with each sentence of the set of sentences corresponds to a weighted average of the intermediate NLI score associated with the first sentence, for each hypothesis statement from the set of hypothesis statements.

4. The method according to claim 3, further comprising:
applying a neural network model on each of the set of hypothesis statements to determine a set of weights associated with the weighted average of the intermediate NLI score, wherein
the final NLI score associated with each sentence of the set of sentences is determined based on the determined set of weights and the intermediate NLI score associated with the first sentence.

5. The method according to claim 1, further comprising
determining, based on the intermediate NLI score, an NLI prediction score of each sentence of the set of sentences, over each of a set of predefined NLI classes;
determining a maximum score for each of the set of predefined NLI classes, based on the determined NLI prediction score of each sentence;
determining a predicted class, based on the determined maximum score of each of the set of predefined NLI classes; and
determining a prediction label associated with the set of texts based on the determined predicted class, wherein the obtained overall NLI score corresponds to the determined prediction label associated with the set of texts.

6. The method according to claim 1, further comprising:
applying a window function on the final NLI score associated with each sentence of the set of sentences;
computing, based on the application of the window function, an average score of a window of a first set of sentences from the set of sentences; and
obtaining the overall NLI score associated with the received set of texts, based on the computed average score of the window of the first set of sentences.

7. The method according to claim 1, further comprising:
determining, based on the intermediate NLI score, an NLI prediction score of each sentence of the set of sentences, over each of a set of predefined NLI classes;
comparing the determined NLI prediction score, of each sentence of the set of sentences, over each of the set of predefined NLI classes, with a first predefined threshold; and
obtaining the overall NLI score associated with the received set of texts, based on the comparison of the determined NLI prediction score with the first predefined threshold.

8. The method according to claim 1, further comprising:
determining a set of key sentences of the received set of texts, based on the final NLI score associated with each sentence of the set of sentences; and
controlling the display of the determined set of key sentences on the display device.

9. The method according to claim 1, further comprising:
identifying, from the set of sentences, a second set of sentences including a set of positive sentences and a set of negative sentences, based on the final NLI score associated with each sentence of the set of sentences;
comparing the final NLI score associated with each of the identified second set of sentences with a second predefined threshold;
determining a type of prediction associated with each of the identified second set of sentences, based on the comparison of the first NLI score, associated with each of the identified second set of sentences, with the second predefined threshold; and
determining a revised label associated with each of the second set of sentences, based on the determined type of prediction.

10. The method according to claim 9, wherein the determined type of prediction is one of a rule-based prediction, a conflicted prediction, or an uncertain prediction.

11. The method according to claim 10, wherein the determined revised label is further based on a user input and the determined type of prediction being the uncertain prediction.

12. The method according to claim 1, wherein the second text corpus associated with the domain is generated further based on:
retrieving a set of ground-truth positive and negative key sentences, based on the set of labels corresponding to the generated second text corpus;
retrieving a set of labelled key neutral sentences;
composing a set of contradicting and entailment pairs, based on the received set of hypothesis statements, and the retrieved set of ground-truth positive and negative key sentences;
composing a set of neutral pairs, based on the retrieved set of labelled key neutral sentences; and
balancing the composed set of contradicting and entailment pairs, and the composed set of neutral pairs, wherein
the generation of the third text corpus is further based on the balanced set of contradicting and entailment pairs, and the balanced set of neutral pairs.

13. The method according to claim 1, wherein the domain corresponds to a license text, a legal agreement text, or an end-user license agreement text associated with an application.

14. The method according to claim 1, wherein the pre-trained NLI model corresponds to an NLI model selected from a set of zero-shot NLI models.

15. One or more non-transitory computer-readable storage media configured to store instructions that, in response to being executed, cause an electronic device to perform operations, the operations comprising:
receiving a set of texts associated with a domain from a first text corpus associated with the domain;
receiving a set of hypothesis statements associated with the domain;
applying a pre-trained natural language inference (NLI) model on each of the received set of texts and on each of the received set of hypothesis statements;
generating a second text corpus associated with the domain, based on the application of the pre-trained NLI model, the generated second text corpus corresponds to a set of labels associated with the domain; and
applying a few-shot learning model on the generated second text corpus to generate a third text corpus associated with the domain,
the generated third text corpus is configured to fine-tune the applied pre-trained NLI model, and
the fine-tuned NLI model is configured to label an input text associated with the domain, based on the received set of hypothesis statements;
controlling a display of the labelled input text on a display device;
selecting a first sentence from a set of sentences from the received set of texts, as a premise;
controlling an execution of a first set of operations to compute a final NLI score associated with each sentence of the set of sentences, the first set of operations includes:
for each hypothesis statement from the set of hypothesis statements:
applying the pre-trained NLI model on the selected first sentence and on the corresponding hypothesis statement, and
determining an intermediate NLI score associated with the selected first sentence, based on the application of the pre-trained NLI model on the selected first sentence and on the corresponding hypothesis statement, and
determining whether all sentences in the set of sentences are processed for the computation of the final NLI score, and
selecting, as the first sentence, a second sentence from the set of sentences, based on a determination that all sentences in the set of sentences are unprocessed; and
computing the final NLI score associated with each sentence of the set of sentences to obtain an overall NLI score associated with the received set of texts, based on an iterative control of the execution of the first set of operations.

16. The one or more non-transitory computer-readable storage media according to claim 15, wherein the set of hypothesis statements associated with the domain include at least one of a positive hypothesis statement, a neutral hypothesis statement, or a negative hypothesis statement.

17. The one or more non-transitory computer-readable storage media according to claim 15, wherein the final NLI score associated with each sentence of the set of sentences corresponds to a weighted average of the intermediate NLI score associated with the first sentence, for each hypothesis statement from the set of hypothesis statements.

18. An electronic device, comprising:
a memory storing instructions; and
    a processor, coupled to the memory, that executes the stored instructions to perform a process comprising:
        receiving a set of texts associated with a domain from a first text corpus associated with the domain;
        receiving a set of hypothesis statements associated with the domain;
        applying a pre-trained natural language inference (NLI) model on each of the received set of texts and on each of the received set of hypothesis statements;
        generating a second text corpus associated with the domain, based on the application of the pre-trained NLI model, the generated second text corpus corresponds to a set of labels associated with the domain; and
        applying a few-shot learning model on the generated second text corpus to generate a third text corpus associated with the domain,
            the generated third text corpus is configured to fine-tune the applied pre-trained NLI model, and
            the fine-tuned NLI model is configured to label an input text associated with the domain, based on the received set of hypothesis statements; and
        controlling a display of the labelled input text on a display device;
        selecting a first sentence from a set of sentences from the received set of texts, as a premise;
        controlling an execution of a first set of operations to compute a final NLI score associated with each sentence of the set of sentences, the first set of operations includes:
        for each hypothesis statement from the set of hypothesis statements:
            applying the pre-trained NLI model on the selected first sentence and on the corresponding hypothesis statement, and
            determining an intermediate NLI score associated with the selected first sentence, based on the application of the pre-trained NLI model on the selected first sentence and on the corresponding hypothesis statement, and
            determining whether all sentences in the set of sentences are processed for the computation of the final NLI score, and
            selecting, as the first sentence, a second sentence from the set of sentences, based on a determination that all sentences in the set of sentences are unprocessed; and
        computing the final NLI score associated with each sentence of the set of sentences to obtain an overall NLI score associated with the received set of texts, based on an iterative control of the execution of the first set of operations.

* * * * *